United States Patent [19]
Cross

[11] Patent Number: 6,069,803
[45] Date of Patent: May 30, 2000

[54] OFFSET RESONANCE ZERO VOLT SWITCHING FLYBACK CONVERTER

[75] Inventor: David A. Cross, Sandy Beds, United Kingdom

[73] Assignee: Astec International Limited, The Hong Kong Special Administrative Region of the People's Republic of China

[21] Appl. No.: 09/249,826

[22] Filed: Feb. 12, 1999

[51] Int. Cl.[7] .................................................. H02M 3/335
[52] U.S. Cl. ............................................... 363/21; 363/56
[58] Field of Search ............................. 363/19, 21, 55, 363/56, 131, 97

[56] References Cited

U.S. PATENT DOCUMENTS

| | | | |
|---|---|---|---|
| 5,410,467 | 4/1995 | Smith et al. | 363/131 |
| 5,485,361 | 1/1996 | Sokal | 363/21 |
| 5,570,278 | 10/1996 | Cross | 363/20 |
| 5,796,595 | 8/1998 | Cross | 363/16 |
| 5,880,943 | 3/1999 | Yokoyama | 363/56 |

OTHER PUBLICATIONS

Stojcic et al. "Small–Signal Characterization of Active–Clamp PWM Converters," 13th Annual Power Electronics Seminar, Blacksburg, Virginia, Sep. 1995, pp. 237–245.

*Primary Examiner*—Shawn Riley
*Attorney, Agent, or Firm*—Coudert Brothers

[57] ABSTRACT

A continuous mode flyback converter circuit which includes elements capable of generating a zero volt switching (ZVS) signal across the power switch. The ZVS generating elements include a switched shunt inductance coupled in parallel with active clamp components and connected across the primary winding of the power transformer. The circuit reduces the reverse recovery current through the secondary stage rectifier and the current through the active clamp switch during operation of the converter. The ZVS generating elements may also be used for flyback converters which do not utilize an active clamp.

38 Claims, 15 Drawing Sheets

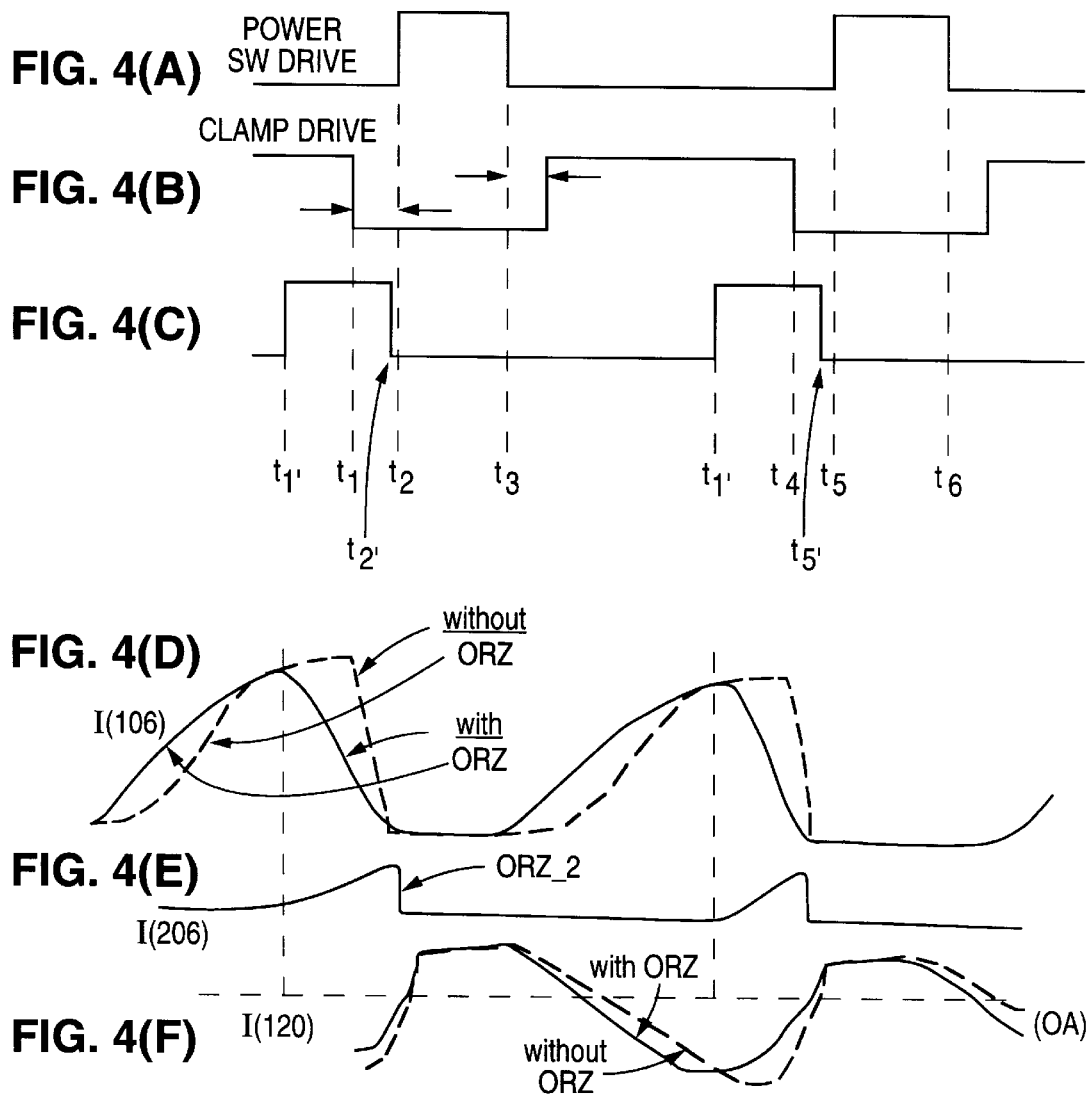

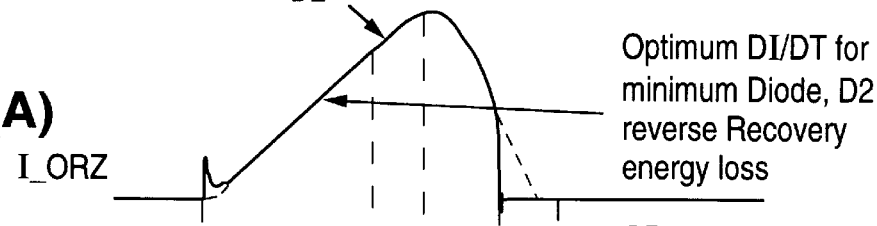
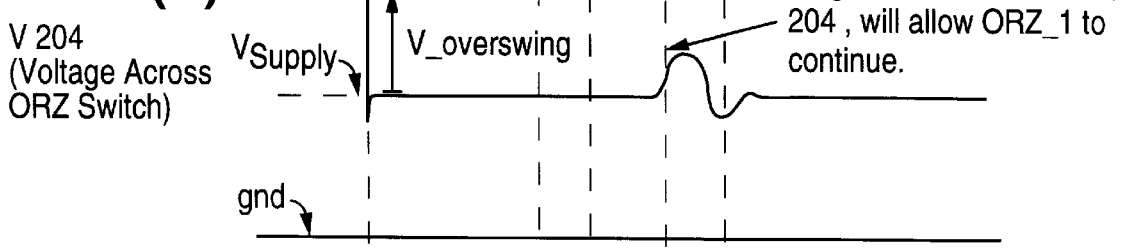
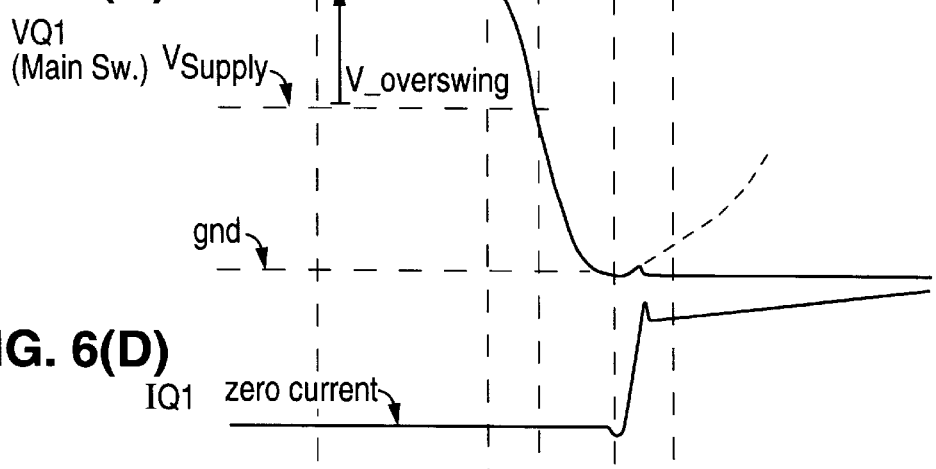
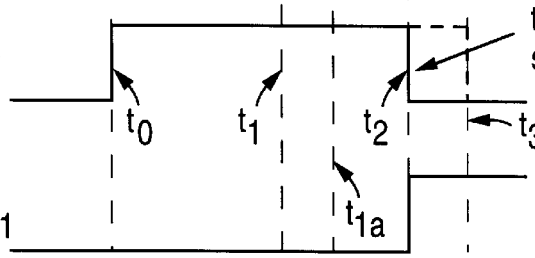

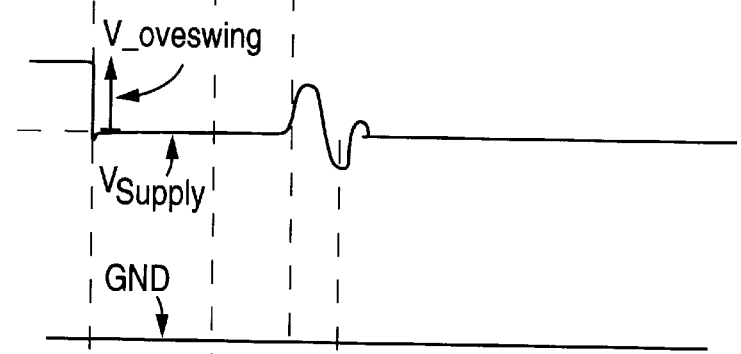
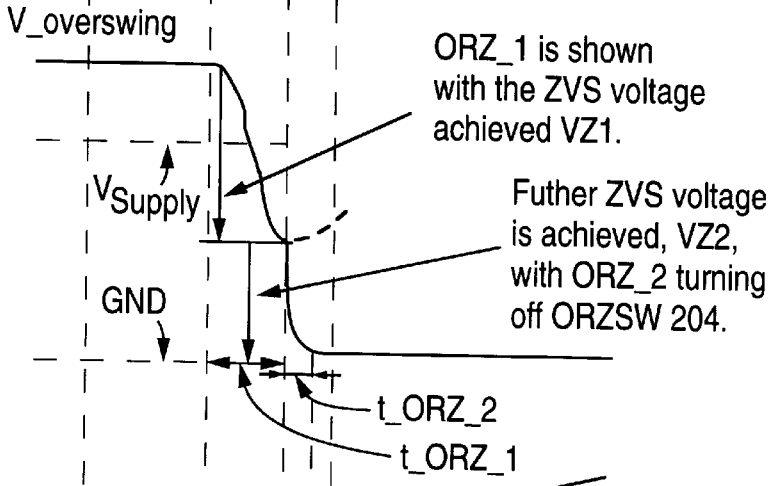
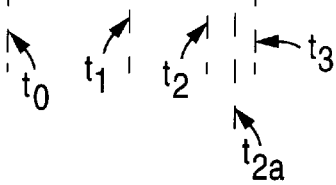

I_ORZ_SW $I_{107}$ $I_{106}$ $V_{DRAIN\ SOURCE}$
ORZ_SW

VQ1

ORZ_2
pre_emptive

I(Q1)

TIMING DRIVE
330

- - - ORZ_2 pre_emptive $I_{106}$
Active Clamped
Continuous Flyback

Continuous Flyback $I_{106}$

Ripple Voltage     Ripple Voltage 2x Voltage of FIG. 8
of Continuous Flyback

Ripple Current
for FIG. 8

Active Clamp Continuous
Flyback Circuit of FIG. 8
Ripple Currents

▨ ← Show Ripple Current in Output Capacitor 108

OFFSET RESONANCE ZERO VOLT SWITCHING FLYBACK CONVERTER

BACKGROUND OF THE INVENTION

1. Field of the Invention

The present invention relates to switched power supplies, and more specifically, to a circuit for a flyback converter which incorporates a switched shunt inductance. The shunt inductance is used to produce a zero volt switching condition across the power switch of the power supply. This permits the power switch to be resonantly switched on with a zero voltage condition, thereby reducing the power loss associated with changing the state of the switch. The circuit may be used in conjunction with an active clamp which provides shaping of the output voltage and a large value for the resonant snubber capacitor or with a flyback converter circuit which does not use clamp elements. The switched shunt inductance reduces the power losses associated with changing the state of the primary switch compared to conventional zero volt switching flyback converter circuits, and improves the overall efficiency of the converter.

2. Description of the Prior Art

Switching or "switch mode" power supplies use a semiconductor device as a power switch to control the application of a voltage to a load. A "flyback" or "buck-boost" converter is used to produce an output (or load) voltage which is of the opposite polarity and which may be of higher, lower, or equal voltage than the input voltage supplied by the input power supply. FIG. 1 is a schematic diagram showing a basic circuit for a prior art flyback converter 100. The operation of power switch Q1 102 is controlled by applying a control signal waveform to control node 103 (e.g., the gate of a FET device). Note that although switch 102 is depicted in the figure as a FET device, it may take other forms such as a bipolar junction transistor, etc. Note also, that although not shown in the figure, a FET device has an associated body diode and stray capacitance.

When switch Q1 is turned "on", i.e., conducting, the input voltage supplied to the input nodes (labeled "SUPPLY" in the figure) is applied across the primary winding ("P1") of power transformer 104. Under steady-state conditions, the current ($I_p$) in P1 will increase linearly with time to a peak value as energy from the input supply is stored in its magnetic core. This is described by the relationship $V=LdI_p/dt$, where L is the value of the magnetizing inductance of the primary winding.

In the situation described, rectifier D1 106 will be reversed biased and thus not conducting. Therefore, current will not flow in the secondary winding ("S1") of power transformer 104 when power switch 102 is on and current is flowing in the primary winding. In addition, under steady-state conditions, current will flow from output capacitor $C_1$ 108 to the load ("LOAD") attached across the output nodes of flyback converter 100. This causes output capacitor 108 to discharge.

When power switch Q1 102 is turned "off", i.e., not conducting, current is no longer supplied by the power supply to the primary winding. The reduction in current flowing in the primary winding causes transformer 104 to produce a back emf which produces an increase in the current ($I_S$) flowing through secondary winding S1. This causes a reversal of the voltages on the windings. When the induced flyback voltage reaches a level greater than the sum of the output voltage across output capacitor 108 and the diode drop across D1, it causes rectifier D1 106 to become forward biased, permitting the primary current (and hence the energy stored in the magnetizing inductance of transformer 104) to be transferred to the secondary winding and ultimately to output capacitor 108 and the load (which is represented as a resistance in the figure). Power switch Q1 102 is then turned back on by application of a suitable signal to control node 103 to start another cycle of the converter.

The flyback converter output voltage, $V_{out}$, is determined by the duty ratio of power switch Q1 and the input supply voltage, SUPPLY, according to $$V_{out} = SUPPLY * D,$$

where D is the duty cycle of the switch and is defined as $t_{on}/(t_{off})$, with $t_{on}$ being the "on" time of the switch during a cycle and $t_{off}$ being the "off" time during a cycle. Turns ratio of the transformer is 1:1 and voltage output and "$V_{OUT}$" in text are the same magnitude.

There are two types of flyback converters, with the two differing in their mode of operation. A discontinuous flyback converter operates in a mode in which all the energy stored in the transformer during an energy storage period (the "on" period of the power switch) is transferred to the output during the flyback (the "off" period of the power switch) period. A continuous flyback converter operates in a mode in which part of the energy stored in the transformer during an energy storage period (the "on" period of the power switch) remains in the transformer at the beginning of the next "on" period. Thus, in a continuous mode flyback converter, the next cycle begins before the current in the secondary winding of the power transformer falls to zero.

When power switch Q1 is turned on, energy is stored in both the transformer's core (the magnetizing inductance) and in the primary side leakage inductance of the transformer (not shown) which is connected in series with the magnetizing inductance. When the power switch is turned off, the energy in the core (magnetizing inductance) is coupled to the secondary winding and output circuit. However, the leakage inductance and stray capacitance of the power switch form a high-frequency LC resonant circuit, so that the energy stored in the leakage inductance "rings" with the stray capacitance of the power switch (i.e., the stored energy causes a voltage waveform which oscillates with a frequency dependent upon the value of the leakage inductance and stray capacitance). This causes the voltage across the switch to increase and results in greater power loss and possible damage to the switch. The "ringing" voltage is typically dissipated by a "snubber" circuit (e.g., a capacitor) connected to the power switch, which acts to damp the resonant circuit. Although use of a snubber circuit can reduce damage to the power switch, it still results in dissipated energy and reduces the overall efficiency of the converter. This is because of the losses associated with the components of the snubber circuit, e.g., the $I^2R$ loss of the resistive element and the energy stored in the capacitive element which is not fully discharged prior to the start of a new converter cycle.

A drawback of switch mode power circuits as described above is that the switching devices in such switch mode power converters are subjected to high stresses and potentially high power loss as a result of the switch being changed from one state to another while having a significant voltage across it. These effects increase linearly with the switching frequency of the waveform used to control the power switch. Another drawback of switched power circuits is the electromagnetic interference (EMI noise) arising from the high values of dI/dt and dV/dt caused when the switch changes state. This interference may cause a disruption in the operation of other, nearby circuits or devices.

The noted disadvantages of switch mode power converters can be reduced if each power switch in the circuit is caused to change its state (from "on" to "off" or vice versa) when the voltage and/or current through it is zero or at a minimum. Such a control scheme is termed "zero-voltage" (ZVS) and/or "zero-current" (ZCS) switching. In the case of switching at a minimum voltage, the control scheme is termed "low-voltage" switching. It is thus desirable to switch the power switching device(s) at instances of zero or minimum voltage in order to reduce stress on the switch(es) and power loss of the converter. This will help to increase the efficiency of the converter.

One method of implementing zero voltage switching is to provide a voltage signal across the power switch which passes through a zero value. This can be achieved in the case of discontinuous mode flyback converters by placing a passive voltage clamp circuit in parallel with the primary winding of the transformer to create a resonant circuit. Energy stored in the transformer's leakage inductance is transferred to the clamp circuit capacitor and back to the primary winding during the flyback cycle, causing a fluctuation in the voltage applied across the power switch.

In the case of a continuous mode flyback converter, an "active clamp" circuit can be used to return the energy stored in the leakage inductance to the input supply line and to provide zero voltage switching of the power switch. Such a circuit configuration is described in U.S. Pat. No. 5,570,278, assigned to the assignee of the present invention, and the contents of which is incorporated herein by reference. FIG. 2 shows the flyback converter of FIG. 1, to which has been added an active clamp circuit designed to provide a zero volt switching signal across the power switch. The active clamp is formed from a series combination of clamp switch ($S_{CL}$) and clamp capacitor ($C_{CL}$) coupled in parallel across the primary winding (P1) of transformer 104. Depending upon the component values and the timing between the control signals applied to the power switch and clamp switch, in the circuit of FIG. 2, the active clamp components can serve the following functions: (1) to provide a ZVS signal across the power switch; (2) to route the energy stored in the leakage inductance to the input instead of having it be dissipated in a snubber circuit; (3) to provide shaping of the output signal; and (4) to provide a ZVS signal through the secondary side rectifier.

The clamp switch and power switch are operated in a manner which causes energy stored in the power transformer's leakage inductance to be transferred to the clamp capacitor and back to the primary winding during the flyback cycle (when switch Q1 102 is off). This will produce a reversing voltage which is applied to the series combination of the leakage inductance and primary winding of the power transformer, causing a fluctuation in the voltage across power switch Q1 102. In order to achieve ZVS behavior, active clamp switch $S_{CL}$ operates substantially in anti-phase relation to power switch Q1 102. The operation of switches Q1 and $S_{CL}$ is non-overlapping, with clamp switch $S_{CL}$ closing after power switch Q1 opens and opening before power switch Q1 next closes.

When active clamp switch $S_{CL}$ is closed (i.e., "on"), clamp capacitor $C_{CL}$ applies a reversing voltage to the series combination of the primary winding P1 and the leakage inductance (not shown). The reversing voltage has a polarity which is opposite to that of the voltage applied to the series combination during the preceding ON period of the power switch. By turning active clamp switch $S_{CL}$ off for a period of time before power switch Q1 is turned on for the next cycle, the voltage across the power switch may be reduced to zero prior to the power switch being turned on. Thus, under appropriate timing conditions between the active clamp switch and power switch, the active clamp components form a resonant circuit which provides a zero voltage signal across the power switch.

At the end of the clamp cycle, when the load has been serviced, the current reflected back to the primary circuit is a function of the "tuning" of the secondary load circuit. The clamp turn off current can be increased by changing the value of the clamp capacitor in a manner independent of the value of the load current. This ensures that a ZVS signal can be generated at higher switching frequencies.

While the addition of an active clamp circuit to a flyback converter permits continuous mode operation with ZVS of the power switch, it does not remove all of the inefficient aspects of the flyback topology. In particular, the reverse recovery losses associated with the secondary stage rectifier D1 (element 106 in FIGS. 1 and 2) can still be significant. In addition, under typical operating conditions, the current through the clamp switch can be high enough to make the $I^2R$ losses in the equivalent series resistance of the clamp capacitor and clamp switch significant. Since the current level though the clamp switch is a function of the primary side leakage inductance and a large leakage inductance is required to generate the ZVS signal in the circuit shown in FIG. 2, this is an inherent disadvantage of using the active clamp components to generate a ZVS signal for the power switch.

What is desired are circuits for continuous flyback converters, both which use active clamp circuits and which do not use active clamp circuits, which have lower power losses and are more efficient than currently available designs of such converters.

SUMMARY OF THE INVENTION

The present invention is directed to a continuous mode flyback converter circuit which includes elements capable of generating a zero volt switching (ZVS) signal across the power switch of the converter. The ZVS generating elements include a switched shunt inductance coupled in parallel with active clamp components and connected across the primary winding of the power transformer. The inventive arrangement allows a reduction in the power transformer's leakage inductance value required for generating the ZVS signal compared to active clamp designs which lack the switched shunt inductance and permits operation of the flyback converter in the ZVS mode with a large value of the resonant snubber capacitance. The inventive circuit reduces the reverse recovery current through the secondary stage rectifier and the turn off losses of the active clamp and primary power switches during operation of the converter. This combination of features results in a reduction in the power loss associated with operation of the converter compared to other active clamp or ZVS flyback converter circuits. The inventive circuit permits operation of the flyback converter using high frequency FET devices or slower switching insulated gate bipolar junction transistors as the power switch, and results in lower power consumption and increased efficiency of the converter. The inventive ZVS elements may also be used in conjunction with continuous flyback converters which do not use an active clamp circuit.

BRIEF DESCRIPTION OF THE DRAWINGS

FIGS. 4(A)–4(F) are a timing diagram describing the operation of the offset resonance zero voltage switching flyback converter of FIG. 3.

FIGS. 6(A) to 6(F) are timing diagrams illustrating the operation of the ORZ Flyback converter of the present invention shown in FIG. 5, for the case where the overswing voltage is comparable to the difference between the supply voltage and ground.

FIGS. 7(A) to 7(G) are timing diagrams illustrating the operation of the ORZ Flyback converter of the present invention shown in FIG. 5 for the case where the overswing voltage is much less than the difference between the supply voltage and ground.

DETAILED DESCRIPTION OF THE INVENTION

Figure 1:
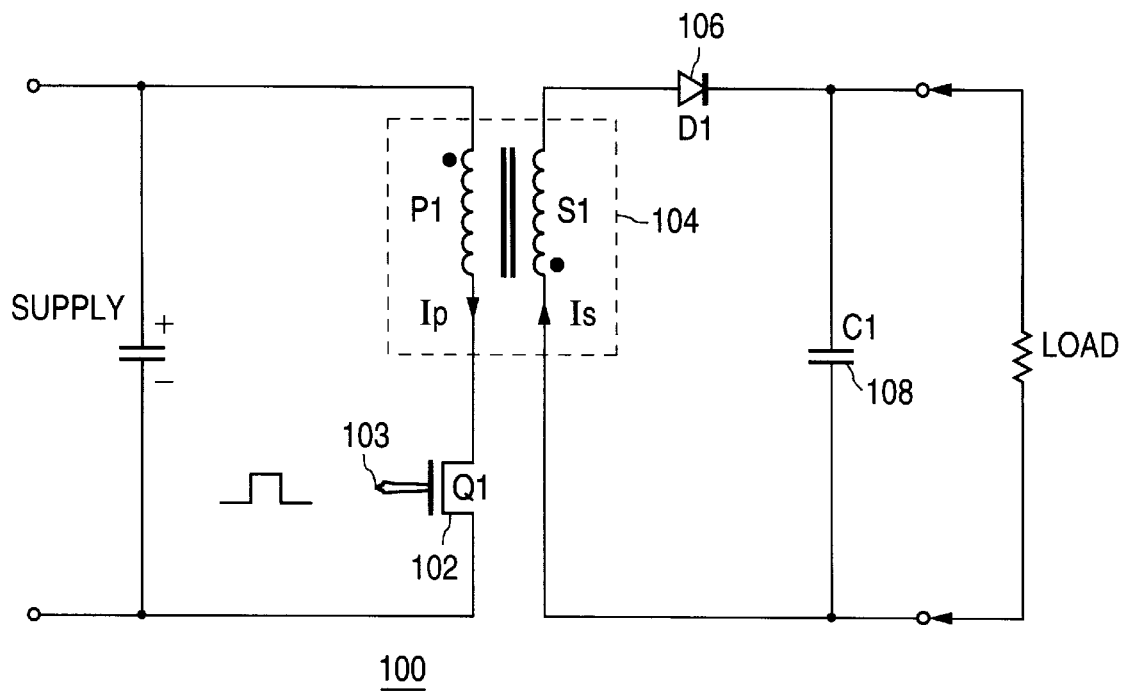
FIG. 1 is a schematic diagram of a basic circuit for a prior art flyback converter.

The present invention is directed to an offset resonance, zero volt switching (ORZ) circuit for a flyback switched mode power converter which includes an active clamp circuit or which does not include such circuit elements. The ORZ circuit includes a switched shunt inductance which is referenced to the input supply level and is used to provide a zero volt switching waveform across the power switch. By referencing the ORZ inductance and switch to the input supply, the voltage across the ORZ inductor when it is switched is the difference between the output voltage and the peak input voltage. This reduces the capacitive losses of the ORZ switch. The combination of an active clamp circuit and the ORZ circuit (in conjunction with appropriate values of the components and timing of the ORZ and active clamp switches) causes a reduction in the reverse recovery losses of the secondary stage rectifier and in the power dissipated through the operation of the active clamp switch. Thus, the present invention provides an increased conversion efficiency over prior art active clamp flyback converters. The present invention also provides increased efficiency zero volt switching for flyback converters which do not utilize an active clamp.

The increased efficiency of the present invention relative to prior art active clamp flyback converters is the result of several factors. Firstly, losses are lowered in the secondary rectifier (element D1 in the figures) by reducing reverse recovery losses. The components of the active clamp are "tuned" (i.e., the component values are selected in such a manner) to have a higher oscillation frequency than used in an active clamp flyback converter without an ORZ circuit. In contrast to prior art active clamp flyback converters where the clamp components are selected to generate a ZVS signal, in the present invention, the active clamp component values are selected such that the active clamp circuit contained in the inventive ORZ active clamp flyback converter could not, by itself, generate the desired ZVS signal. This permits generation of a ZVS signal across the power switch and reduced power losses associated with operation of the secondary rectifier and clamp switch compared to converters found in the art.

In operation of the inventive circuit, during the first portion of the OFF period of the main power switch, the active clamp circuit accepts current from the power transformer, which causes the current in the secondary rectifier to gradually increase, rather than experience an abrupt increase as in a conventional active clamp flyback converter. During the next portion of the OFF period, the active clamp returns current to the transformer, which then outputs that current to the secondary circuit. This causes the secondary current to peak up more than it would if there were no active clamp. This current peaking also occurs in a flyback converter having an active clamp but without the ORZ components, but in that case is delayed in time by approximately one-quarter of an OFF period. Finally, in the last portion of the OFF period, the active clamp draws current from the transformer again (just as in the first portion of the period), which causes less current to be output to the secondary circuit. This reduces the current in the secondary rectifier significantly before turn on of the power switch, substantially lowering reverse recovery currents and the associated power losses.

In addition, the peak current across the active clamp switch is reduced because of the inventive active clamp ORZ circuit's use of a lower value of the primary side leakage inductance relative to prior art active clamp flyback converters. This is because the ORZ switch and inductance are used to provide the zero volt switching signal instead of the primary side leakage inductance acting with the active clamp components.

The primary loss factors of an active clamp flyback converter without ORZ components are the $I^2R$ losses in the ESR (equivalent-series resistance) of the clamp capacitor and the clamp switch, and the turn-off losses of the clamp switch. Lowering the peak current through these elements as a result of lowering the leakage inductance lowers the magnitude of all of these losses. Prior to the active clamp switch being turned off, the ORZ switch is turned on which reduces to zero the current in the active clamp, $S_{CL}$ in FIG. 3, and removes the current that was flowing from the clamp capacitor, $C_{CL}$, through the primary transformer winding P1 to the secondary winding S1 and finally through the diode D1 to the output capacitor C1. However, the secondary transformer continuous flyback current will still be flowing out of transformer 220, and thus the voltage on the anode of D1 will change only when the current in D1 has been reduced to zero by the action of the primary ORZ switch in conjunction with the ORZ inductance. The current in the ORZ switch will then equal, albeit reflected through transformer 220, the secondary transformer continuous flyback current.

By incorporating the ORZ circuit elements into an active clamp flyback circuit, it is possible to turn the clamp switch off with a zero current characteristic. This significantly reduces the power losses associated with operation of the clamp and is not possible with an active clamp flyback circuit alone, unless zero volt switching is not achieved (which lowers the efficiency of the converter). At the same time, it provides the benefits of the active clamp circuitry, e.g., shaping of the secondary side current and zero volt switching (ZVS) of the secondary side rectifier.

Figure 2:
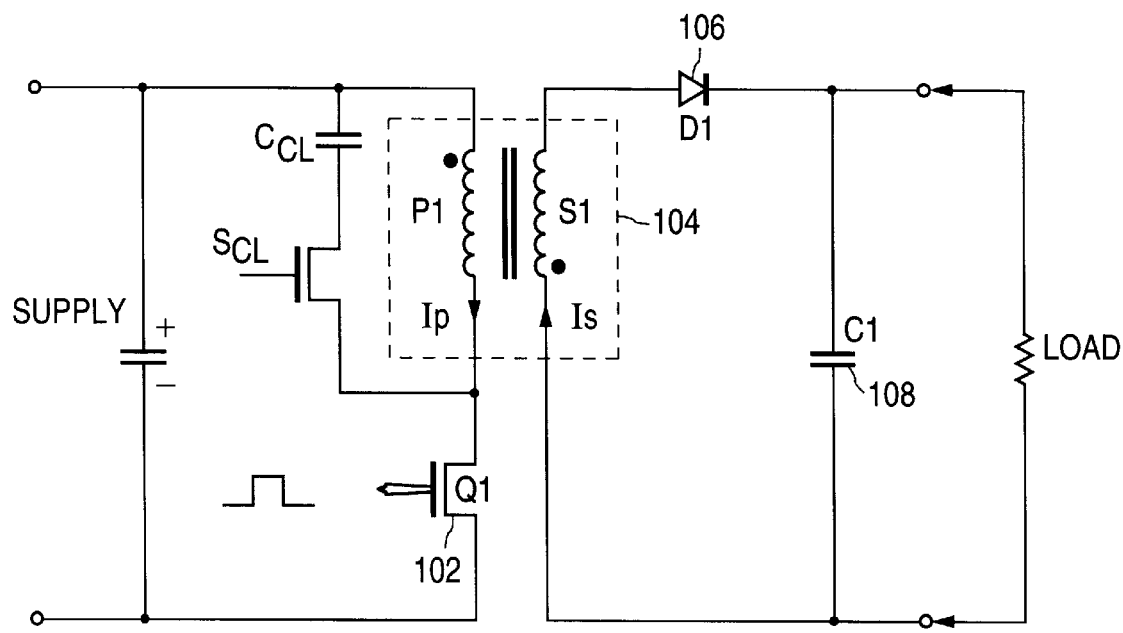
FIG. 2 shows the flyback converter of FIG. 1, to which has been added an "active" clamp circuit to provide a zero volt switching signal across the power switch.
Figure 3:
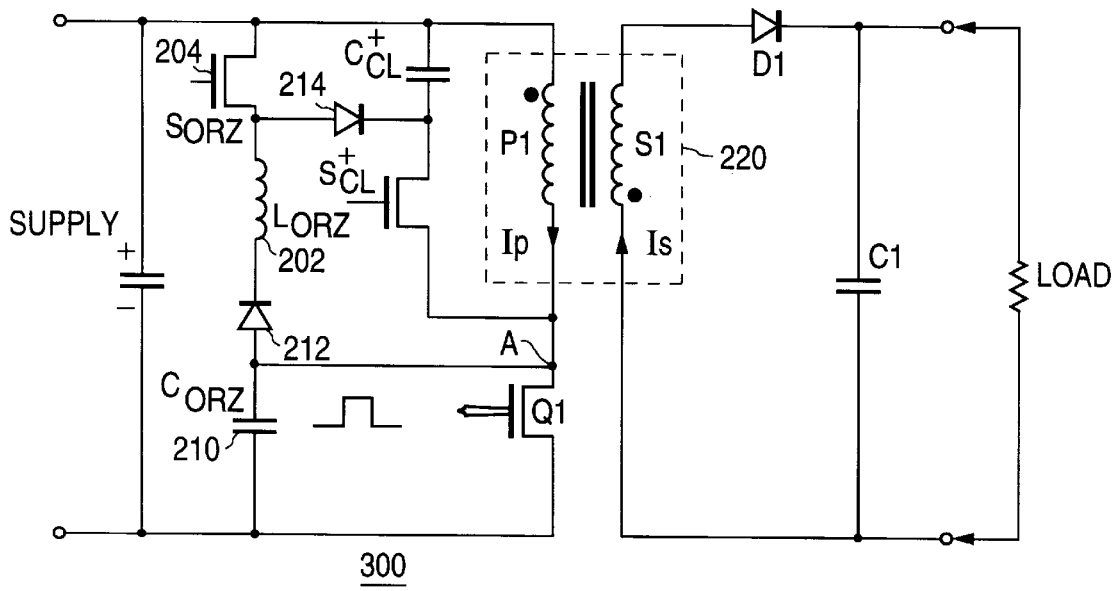
FIG. 3 is a schematic diagram of the offset resonance zero voltage switching active clamp flyback converter of the present invention.

FIG. 3 is a schematic drawing of an embodiment of the offset resonance zero voltage switching (ORZ) active clamp flyback converter 200 of the present invention. As shown in the figure, ORZ active clamp flyback converter 200 has certain circuit elements in common with the active clamp flyback converter of FIG. 2. However, in accordance with the present invention, ORZ converter 200 includes switched shunt inductance 202 (labeled "$L_{ORZ}$" in the figure) and ORZ switch 204 (labeled "$S_{ORZ}$" in the figure). Switch 204 and ORZ inductor 202 are coupled together in a series combination. The series combination of the two components is coupled in parallel across the primary winding of the power transformer.

Also part of the ORZ circuitry is a capacitor 210 (labeled "$C_{ORZ}$") coupled at node A, where node A couples primary transformer winding P1 and power switch Q1. Capacitor 210 is grounded to the main ground line (or negative potential as shown in the figure), and represents the parasitic capacitance of power switch Q1, transformer P1, and diode D1. Additionally, capacitor 210 may comprise a discreet component (e.g., a resonant snubber capacitor) coupled in parallel with the parasitic capacitance. This may be used to achieve the desired operating characteristics of the ORZ circuitry by modifying the transient generated by primary winding P1 (or ORZ inductor 202) when power switch Q1 (or ORZ switch 204) is turned off. A large value of the snubber capacitance assists in producing a significant reduction in the turn off losses of the power switch, thereby improving the efficiency of the inventive converter. This permits the use of high frequency FET devices for the power switch in conjunction with low power losses. It also permits slower switching devices such as insulated gate bipolar transistors (IGBTs) to be used for the power switch. In addition, due to the reduction in the active clamp switch turn off loss obtained by the inventive circuit, IGBTs may also be used for that switching device.

Note that although FIG. 3 shows that the converter circuit includes active clamp switch $S^*_{CL}$ and active clamp capacitor $C^*_{CL}$, as has been noted, the characteristics of these components are not the same as the clamp components in an active clamp flyback converter which does not have the ORZ elements. In particular, the value of $C^*_{CL}$ in FIG. 3 is different from that of $C_{CL}$ in FIG. 2, with the leakage inductance of the primary side of transformer 220 and $C^*_{CL}$ being insufficient to form a LC resonant circuit which will produce a zero volt switching condition across power switch Q1 as a result of turning off the clamp switch $S^*_{CL}$.

During operation of the inventive circuit, active clamp switch $S^*_{CL}$ operates substantially in anti-phase relation to power switch Q1. The operation of switches Q1 and $S^*_{CL}$ is non-overlapping, with clamp switch $S^*_{CL}$ closing after power switch Q1 opens and opening before power switch Q1 next closes. $L_{ORZ}$ shunt inductance 202 is activated prior to the closing of the clamp switch and remains so until just prior to the turning on of power switch Q1. This causes the full clamp current to be in ORZ inductor 202 when the clamp switch is turned off. This is achieved by switching ORZ switch 204 "on" prior to turn off of the clamp switch and then switching ORZ switch 204 off prior to turning switch Q1 on.

When ORZ switch 204 is on, ORZ inductor 202 is coupled in parallel across the primary winding of the power transformer. At this time, ORZ inductor 202 has a high positive voltage across its terminals due to the fact that the voltage at node A is near the voltage of the output, $V_{out}$. The positive voltage causes the current in ORZ inductor 202 to ramp up linearly with time. This behavior is described by the relationship, $V = L_{ORZ} dI/dt$, where I is the current in the inductor and V is the voltage across the inductor. The current ramps up until it equals the current flowing through the primary winding of the power transformer, P1. As the voltage across ORZ inductor 202 is still positive at this time, the current in it continues to increase above the amount that is flowing in the primary winding. To make up the difference in current between that provided by primary winding P1 and that required by inductor 202, charge is drawn from ORZ capacitor 210, in accordance with the capacitor voltage current relationship(s) $I = CdV/dt$ and $Q = CV$. The charge drawn from capacitor 210 by ORZ inductor 202 causes the voltage across capacitor 210 to decrease. With diode D1 shut off and with the primary winding acting substantially like a current source, ORZ inductor 202 and capacitor 210 form a second order resonant circuit which causes the voltage at node A to fall towards zero volts in a sinusoidal manner. When the voltage at node A reaches a minimum, power switch Q1 may be turned on with a minimum voltage across its conduction terminals (i.e., drain and source for a MOSFET device, collector and emitter for a bipolar transistor), providing low voltage switching.

With power switch Q1 turned on and the voltage at node A equal to a very small voltage due to the LVS signal, a negative voltage is now applied across ORZ inductor 202. The negative voltage causes the current in inductor 202 to decrease in a linear manner. The current in inductor 202, which was used to produce the low voltage switching signal, is returned back to the input power supply line, to be re-used during a subsequent switching cycle. This reduces the power required to operate the converter.

After ORZ switch 204 is closed, a current will build up in ORZ inductor 202, with the magnitude of the current being independent of the component values of the ORZ circuit elements. As further recognized by the present inventor, the voltage swing through the ORZ inductor-capacitor combination, with the common node at a high level and current flowing, is symmetrical over time and independent of the LC component values. Thus, the effect of the ORZ current is to increase the excursion of the voltage across the power switch below the supply rail. If the voltage excursion below the supply is close to or exceeds that of the input supply level, then a low or zero voltage condition across the power switch will occur. The magnitude of the voltage excursion depends upon the converter topology and circuit conditions, and is equal to at least the overswing voltage present when ORZ switch 204 is turned on, with $V_{overswing}$ being a function of the turn ratio of transformer 220, the value of $C^*_{CL}$, and the transformer leakage inductance.

Generally, ORZ switch 204 may be turned off just prior to, during, or after the turn on of the power switch. This permits generation of the zero or low voltage signal across the power switch, while allowing the relative timing of the ORZ, clamp, and power switches to be varied to optimize the circuit for differing component values and operating conditions (e.g., high frequency). In addition, as will be described, the relative timing of the turn off of the ORZ switch and turn on of the power switch will affect the power consumption and efficiency of the converter.

FIG. 4 is a timing diagram describing the operation of the offset resonance zero voltage switching flyback converter of FIG. 3. FIG. 4(A) shows the drive signal used to control the operation of power switch Q1 (labeled "Power Sw. Drive" in the figure). As shown, the drive signal is a square wave which causes the switch to be turned on between the time interval from $t_2$ to $t_3$, off between the time interval from $t_3$ to $t_5$, and on again between the time interval from $t_5$ to $t_6$.

FIG. 4(B) shows the drive signal for the active clamp switch $S^*_{CL}$ of FIG. 3 (labeled "Clamp Drive") as a function of time. As shown, the active clamp is turned off prior to the power switch being turned on and remains off until some time after the power switch is turned off. FIG. 4(C) shows the drive signal for the ORZ switch of FIG. 3 as a function of time. As shown in the figure, the ORZ switch is turned on (corresponding to time $t_1'$ in the figure) prior to when the clamp switch is turned off. The ORZ switch is turned off (corresponding to time $t_2'$) sometime prior to when the power switch is turned on. This insures that all of the clamp switch current will be in the ORZ inductor when the clamp switch is turned off. FIG. 4(D) shows the current through the secondary side rectifier (diode D1) as a function of time for the case when the inventive ORZ components are used (labeled "with ORZ" in the figure) and the case when the inventive ORZ components are not used (labeled "without ORZ" in the figure). FIG. 4(E) shows the current through the ORZ switch as a function of time. FIG. 4(F) shows the current through the primary transformer inductance as a function of time for the case when the inventive ORZ components are used (labeled "with ORZ" in the figure) and the case when the inventive ORZ components are not used (labeled "without ORZ" in the figure).

Note that the voltage across the ORZ inductor when it is switched into the inventive circuit is the difference between the flyback converter output voltage and the input supply voltage. This causes the current through the ORZ switch at turn off of that switch to be very low, and results in reduced power dissipation during the operation of the ORZ switch as compared to the operation of the power switch in other zero or low voltage switching circuits. In addition, the peak current in the ORZ switch is lower than that in a power switch for a conventional ZVS circuit because the current buildup in the ORZ inductor after it reaches the level of the primary inductor is controlled by the voltage across the inductor, i.e., the difference between the output voltage and the input voltage.

For example, in the case of a conventional ZVS switching technique, the capacitive power loss associated with the switching of the power switch is proportional to the square of the output voltage. However, in the case of the inventive ORZ circuit, the capacitive power loss associated with the switching of the ORZ switch is proportional to the square of the difference between the output voltage and the input voltage. The reduced voltage differential across the ORZ switch as compared to that across the power switch in the case of conventional ZVS switching permits higher frequency operation, or use of a lower resistance FET device as the power switch, thereby resulting in a reduced power loss for the flyback converter. Thus, the method of handling the energy stored in the ORZ inductor described herein results in a significant improvement in the overall efficiency of the converter, and is not found in the active clamp flyback topology shown in FIG. 2.

As discussed, the turn off of ORZ switch 204 may occur just prior to, at the same time as, or after the turn on of power switch Q1. In this regard, it is important that ORZ switch 204 be turned off before the current in ORZ inductor 202 becomes zero and then goes negative, as this would potentially cause current to flow from the input supply line to node A through ORZ inductor 202. To ensure that this current path does not occur, a rectifier 212 may be included in the series combination of ORZ switch 204 and ORZ inductor 202, with rectifier 212 oriented to permit current to flow from ORZ switch 204 to ORZ inductor 202 in normal operation. Rectifier 212 thus provides an extra measure of safety in case the timing signal for ORZ switch 204 is not well controlled with respect to the control signal for power switch Q1.

Rectifier 212 must also be used because during the periods where the main switch Q1 is conducting; the body diode of $S_{ORZ}$, which can be either a P or N channel FET, would also conduct and it is the body diode of $S_{ORZ}$ which prevents any excessive voltages from being superimposed on $S_{ORZ}$ above $V_{OVERSWING}$. Rectifier 212 is important both to control the maximum voltage rating for $S_{ORZ}$ and rectifier 212 is also a protection measure to prevent "reverse operation" of switch 204.

ORZ flyback converter 200 incorporates a shunt inductance ($L_{ORZ}$ 202) which may be selectively connected or disconnected between the primary winding of transformer 220 and the input supply line by the action of switch 204. ORZ inductance 202 provides a magnetic energy storage device which may be used as part of a resonant network to generate a zero volt crossing signal across the power switch. However, instead of that energy being dissipated by the circuit (and therefore reducing the power conversion efficiency of the converter), a portion of the energy stored in the ORZ inductor can be returned to the input. This provides an improvement in the efficiency of the converter compared to circuits in which a zero or low voltage switching signal is produced by a resonant network referenced to the output level.

Figure 5:
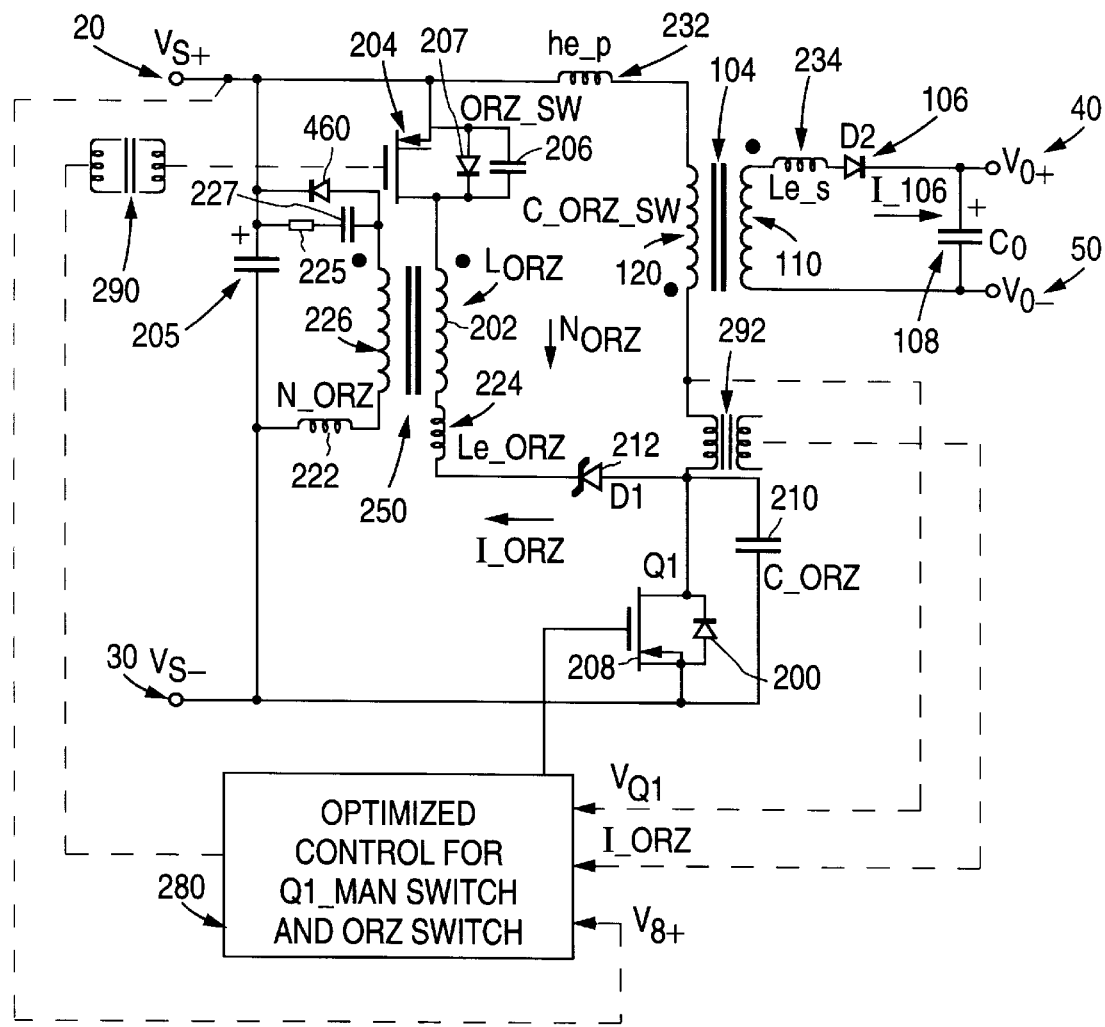
FIG. 5 is a schematic diagram of a second embodiment of the offset resonance zero voltage switching flyback converter of the present invention.

FIG. 5 is a schematic diagram of a second embodiment of the offset resonance zero voltage switching flyback converter of the present invention. Note that the converter circuit of FIG. 5 does not include active clamp elements. In the embodiment of FIG. 5, the anode of diode 212 is connected to the drain of power switch Q1 and to one end of capacitor $C_{ORZ}$ 210. The source of ORZ switch 204 is connected to the input supply and ORZ inductor 202 is connected between the cathode of diode 212 and the drain of ORZ switch 204. Any negative voltage excursion associated with the ORZ inductor will be clamped by body diode 207 of ORZ switch 204. However, this allows one end of $L_{ORZ}$ 202 to move positive and the other end to move negative when the switch is turned off, as would occur during a discharge of the leakage inductance associated with the ORZ inductor. This leakage inductance is shown as inductor 224 in FIG. 5. The energy stored in the leakage inductor will move the ORZ switch drain to source capacitance positive, and via diode 212, will move ORZ capacitance 210 negative.

The drain to source capacitance for the ORZ switch is shown as capacitance 206 in the figure. Its value is highly non linear and proportional to the voltage across the ORZ switch. Note that with a low voltage across the switch this capacitance could be higher than ORZ capacitance 210. Typical values for ORZ switch capacitance 206 at low voltage (e.g., 5 to 20V) range from 4 nF to 1 nF, and typical values of $C_{ORZ}$ range from 500 pF to 2 nF.

The disconnection of the ORZ inductor from $C_{ORZ}$ 210 by means of diode 212 allows a larger time period between the turn off of the ORZ switch and the turn on of power switch Q1, because $C_{ORZ}$ will act to restore towards the input supply after attaining maximum ZVS based on the time constant of power transformer primary winding inductance 120 and leakage inductance 232, rather than with the much lower value of the ORZ inductor. If ORZ switch 204, in FIG. 3, is turned off significantly after time $t_2$, as shown in FIG. 4(C), no energy within $L_{ORZ}$ is transferred to the clamp capacitor $C_{CL}$ or ZVS energy transferred to $C_{ORZ}$ 210. The energy from $L_{ORZ}$ is connected to the clamp capacitor via diode 214.

Any residual energy in the ORZ inductor can be coupled to the supply via a winding 226 coupled to ORZ inductor 202. The turns ratio of an ORZ transformer formed from windings 226 and 202 can be adjusted to achieve the maximum ORZ zero volt switching benefit. Winding 226 coupled to ORZ inductor 202 does not have to be low leakage and in fact will benefit from having significant leakage inductance on the primary (element 224) and secondary (element 222) sides, as this will allow maximum ZVS before the clamping action of the secondary into capacitance 205 via diode 460. When the current in secondary winding 226 of the ORZ transformer falls to zero, snubber components 227 and 225 will prevent any significant resonant ring. Note that in FIG. 5, a controller 280 for generating control signals to optimize the operation of the ORZ and power switches is shown. The operation of this controller will be described in greater detail later in this specification.

FIGS. 6(A) to 6(F) are timing diagrams illustrating the operation of the ORZ Flyback converter of the present invention shown in FIG. 5, for the case where the overswing voltage is comparable to the difference between the supply voltage and ground. This situation normally applies to low supply line operation where a pre-regulator Boost converter is not used, and results in a supply voltage between 120V and 200V DC and an overswing voltage of approximately 100V to 150V.

As shown in FIG. 6(A), during the period from to $t_0$ to $t_1$, the current builds up in the ORZ inductor in the same manner as for the embodiment of FIG. 3, until that current is equal to the current through diode 106, which is reflected from the secondary of the power transformer. As can be seen from the figures, the value of the ORZ inductor needed to obtain the same rate of change of current, DI/DT, applied to diode 106 will be proportional to the difference in overswing voltage and the turns ratio of the transformer:

$$DI/DT = (V_{overswing}/N)/L_{ORZ}$$

where N is the turns ratio of main transformer 104 in FIG. 5.

The current in the ORZ inductor (shown in FIG. 6(A)), will continue to build up between times $t_1$ and $t_{1a}$. After time $t_{1a}$, the voltage across the ORZ inductor will change in phase, as the voltage has dropped to zero across the ORZ inductor (see FIG. 6(B)). The voltage across the main switch, VQ1, is shown in FIG. 6(C). At time $t_{1a}$, this voltage will become negative and the current in the ORZ inductor will begin to fall. This current has therefore dropped considerably before full ZVS is achieved at time $t_2$. The residual energy in the ORZ choke at this time is shown as the hatched region in FIG. 6(A). As is shown by a dotted line in FIG. 6(C), after time $t_2$, the natural inclination of the resonant circuit for this type of resonance will be to resonate back to the supply level.

After time $t_2$, the option may be taken to turn off ORZ switch 204, with the result being to connect any residual energy within ORZ choke 202 coupled from the primary of the ORZ transformer (via diode 460) to the input supply capacitor 205. This is a second type of resonance state which makes use of the leakage of the ORZ inductor rather than just its inductance. Note that there will be a connection to ground via main switch Q1 which will reduce the current in Q1. However, this will probably not cause a large reverse current to flow in Q1, as this would require that the current be greater than the load current through Q1 shown in FIG. 6(D) at the time near $t_2$. As can be seen, the reverse voltage across ORZ switch 204 at the instant of turn off arises from the supply on the drain of the ORZ switch and from negatively discharging the other end of the ORZ inductor via diode 212 and ORZ capacitance 210.

The slew rate of the voltage which will determine the turn off loss of the ORZ switch is a function of the current in the ORZ inductor at the instant of turn off and the ratio of the capacitances referred to both ends of the ORZ inductor. As the current in the ORZ inductor is constant:

$$V\_ORZ\_SW*C\_ORZ\_SW = I\_ORZ\_2 * \text{Fall time} = V1 * CORZ$$

or $$V\_ORZ\_SW = ((C\_ORZ/C\_ORZ\_SW)) * V1,$$

where V1 is the voltage change at the Q1 drain node, and V_ORZ_SW is the voltage change at the ORZ switch node. The rate of fall will depend upon the value of the current through the ORZ inductor during the second resonance condition and will be determined by the leakage inductance of the ORZ inductor as affected by the relevant capacitance at each end of the inductor. This may be understood from:

Rise time at ORZ switch drain=(2*PI/4)SQRT(Le_ORZ*C_ORZ_SW);

Rise time at the Q1 drain node=(2*PI/4)SQRT(Le_ORZ*C_ORZ), where Le_ORZ is the ORZ inductor leakage inductance, C_ORZ_SW is the ORZ switch capacitance, and C_ORZ is the ORZ capacitance.

Note that, as shown in FIG. 6(E), which is the gate drive signal for the ORZ switch, the timing can be extended from turning off at time $t_2$ up until time $t_3$. During this time the drive signal for main power switch Q1 (shown in FIG. 6(F)) remains turned on at time $t_2$ in order to clamp one end of ORZ inductor 202.

This mode of operation is possible because the voltage across the ORZ inductor has reversed and has a voltage of approximately the difference between the supply voltage and ground across it (see FIG. 6(B)). Because of the operation possible with the embodiments of FIG. 5, which is without an active clamp, and FIG. 3, which has an active clamp, the current involved can be sent back to the supply with a very low noise zero current turn off for switch 204 and diode 207. This mode is of benefit for situations in which the zero volt switching condition was achieved with the first type of resonance state described previously, i.e., the resonance where the energy stored in the leakage inductance of the ORZ inductor was not used. Note that diode 212 is not a schottky type device and hence would have some reverse recovery ringing that may require suppression via snubber components 225 and 227.

Figure 7G:
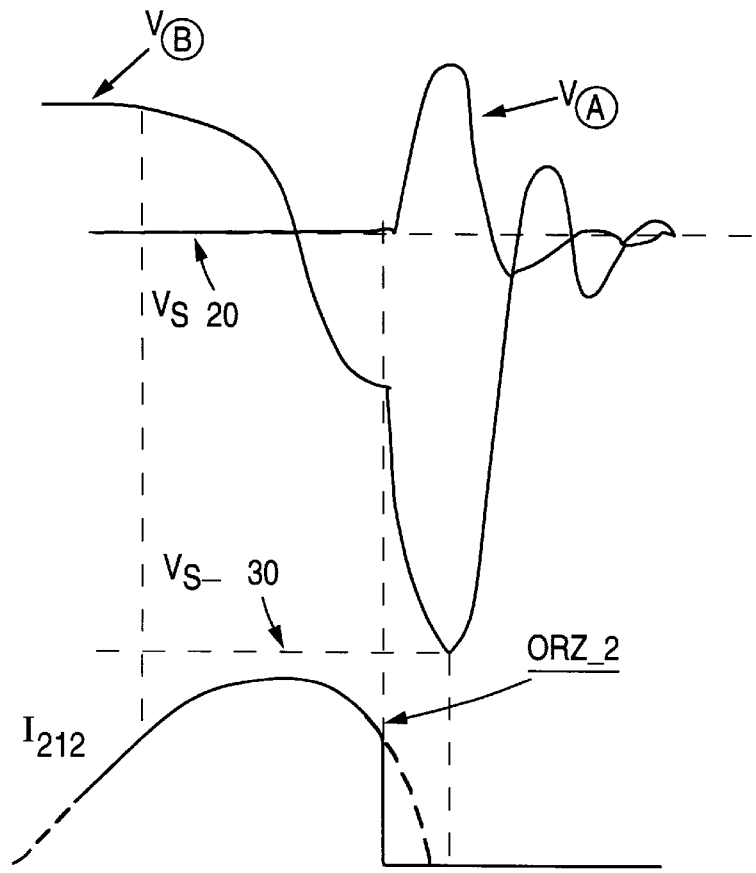
Figure 7H:
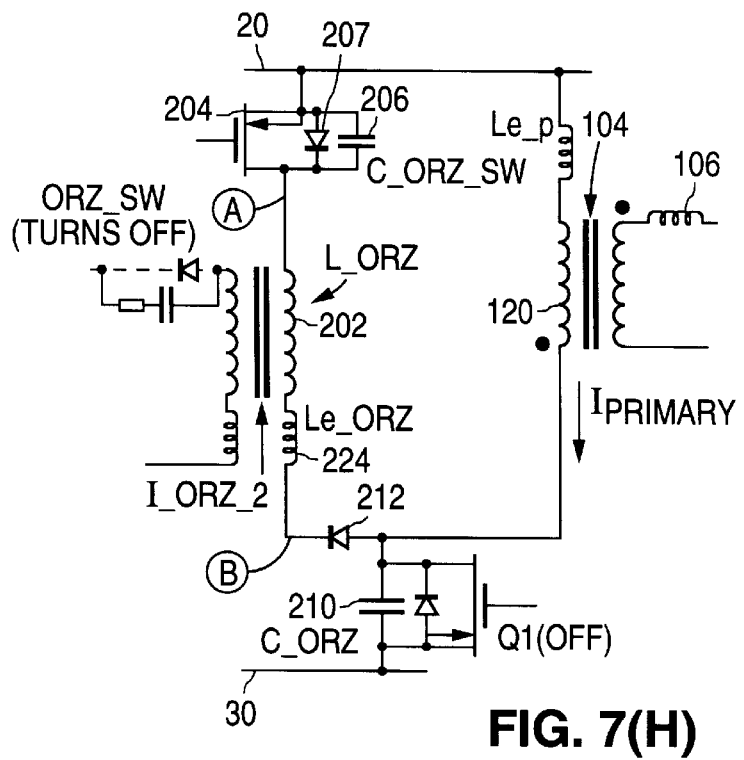
FIG. 7(H) is a schematic diagram showing a portion of the primary side circuit of FIG. 5 and the currents flowing in those elements.

FIGS. 7(A) to 7(F) are timing diagrams illustrating the operation of the ORZ Flyback converter of the present invention shown in FIG. 5 for the case where the overswing voltage is much less than the difference between the supply voltage and ground. FIG. 7(H) is a schematic diagram showing a portion of the primary side circuit of FIG. 5 and the currents flowing in those elements. The diagrams in FIGS. 7(A) to 7(F) correspond to the case of the second type of resonance condition discussed, i.e., where the energy stored in the leakage inductance of the ORZ inductor is used to drive the voltage across the main power switch even lower. This situation differs from a normal turn off (the first type of resonance) where one end of the inductive component is tied to the supply and the rate of change of voltage across the switch is limited by the capacitance at the turn off node associated with the inductor. In the case corresponding to FIGS. 7(A) to 7(F), the turn off is affected by the capacitance at both ends of the ORZ inductor. This means the turn off for the ORZ switch can be very low loss as the breaking of the current in the switch will produce a relatively slow voltage change, with the change being limited in slew rate and having a voltage proportional to the capacitance at both nodes of the inductor.

An amorphous core can be included in series with the ORZ inductor, however, this is not mandatory. If the amorphous core is included to reduce resonant voltage changes after the current has reduced to zero in the ORZ inductor, significantly lower loss will result as compared to a ground referenced case. However other lower loss, higher frequency techniques can also be used, e.g., snubber components.

FIGS. 7(A) to 7(F) refer to the situation in which the overswing voltage is much less than the difference between the supply voltage and ground. This situation would arise for a high supply line voltage or when a Boost pre-regulator is used to supply a high DC voltage. In such cases, the input voltage supply level would be between 360V and 390V and the overswing voltage would typically be around 100V. This results in a minimum first type of resonance voltage of around 290V on the drain of power switch Q1. This condition will result in significant energy being left in the ORZ capacitance, with this energy being discharged by the main switch Q1 without recovering the energy.

As is illustrated in FIG. 7(C), complete zero volt switching cannot be achieved completely for this situation by operating the circuit in the first type of resonance mode, but can be achieved by the subsequent use of the second type of resonance condition. This is for the following reason. The energy the resonant circuit provides is an integration over the period of the average voltage difference across the ORZ inductor which will provide enough resonance energy to push the voltage on the ORZ inductor below the supply level by at least much as the energy gained. The ORZ resonance operating with a continuous current in the transformer, i.e., the current through diode 106 greater than zero, will ensure a larger integrated energy and push the inductor to a lower voltage. However, the main transformer continuous current will hold back ORZ inductor 202 from dropping further, as illustrated by the voltage at $t_2$. Essentially, in this situation the inductor current is attempting to become equal to the primary transformer current reflected back from the secondary.

The reason that operation in the second resonance condition causes the voltage to reduce at a higher rate is that the current still flowing in ORZ switch 204 will cause the current to flow out from the ORZ inductor and into the ORZ capacitor and the drain source capacitance of the ORZ switch, instead of supplying the continuous load current. Thus, it is in effect disconnected from the main inductor current by the leakage inductance of the ORZ inductor. As can be seen in FIG. 7(B), after time $t_2$ the voltage at one end of the ORZ inductance rises, while the voltage at the other end of the inductance falls. Prior to time $t_3$ there is no residual energy left in the ORZ inductor prior to diode 206 conducting, and the energy has been used to commutate the large value of ORZ capacitance.

This suggests that a control algorithm can be used to extract the energy in the inductor earlier into the second type of resonance condition, and thereby maximize the switching behavior achieved. Typically, the second type of resonance would be used after a fixed overall period of the first type of resonance, if full ZVS has not been achieved to terminate the pulse. However, the control method to be described is one which calculates the amount of energy left in the inductor and the residual voltage on the ORZ capacitor to determine when the first resonance condition pulse should be terminated, and differs from preventing the second type of resonance condition. Operation in the second type of resonance condition is precluded in prior art circuits concerned with high secondary current loads where no resonance capacitance is used, and only stray or inherent component capacitance's which might be modified by electromagnetic interference are of concern.

Note that semiconductor devices suitable as high current, low voltage synchronous and schottky rectifiers have large values of intrinsic capacitance which will be reflected to the primary of the transformer and can be used as a significant part of $C_{ORZ}$.

The optimization algorithm is as follows:

1. DO WHILE ((0.51_orz * (I_ORZ) **2. .LT. 0.5*CORZ * (V_Drain QI) **2. AND.
         VQ2 GE 0.9 * (V$_s$ + V$_{OVERSWING}$)
     OR.
     T ORZ.LT. Max Duration )
2. ! Allow ORZ_1 to continue
3. END DO
4. Create an ORZ_2 turn off This control algorithm causes the circuit to cycle around in the first ORZ resonance condition while energy in the ORZ inductor is less than the energy necessary to discharge the ORZ capacitance and the voltage on the drain of the main power switch is still at the $V_{OVERSWING}$ level until diode D1 has recovered, OR the time of the ORZ pulse is less than a Max Duration time, possibly around 300 nS.

Measuring both the voltages on the switch, which would be already monitored for a ZVS condition, and suitable placement of the normal current transformer should allow the current measurement to provide the desired control signal. FIG. 7(G) is an enlarged view of FIG. 7(A), and shows the current through the ORZ switch and the voltage at nodes A and B of the circuit, as identified in FIG. 7(H).

Figure 8:
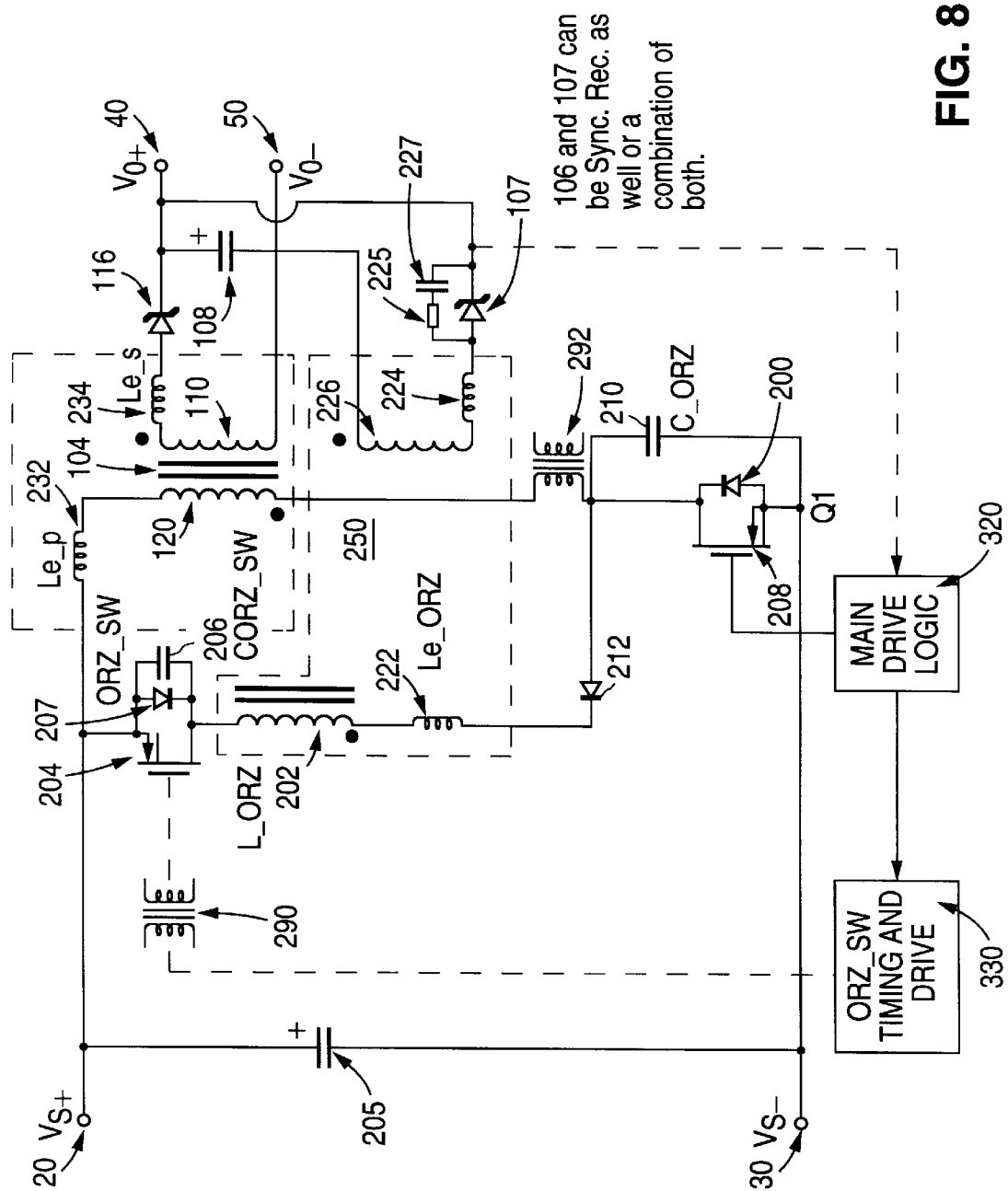
FIG. 8 is a schematic diagram of another embodiment of the offset resonance zero volt switching flyback converter of the present invention.
Figure 10A:
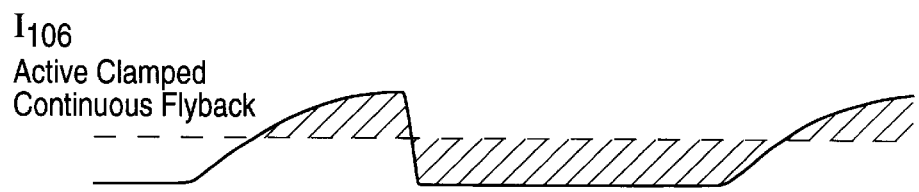
FIGS. 10(B) to 10(D) are waveforms showing the ripple current and voltage for the circuit of FIG. 8, and FIGS 10(A) and 10(E) are similar waveforms with the addition of an active clamp to FIG. 8.
Figure 10B:
Figure 10C:
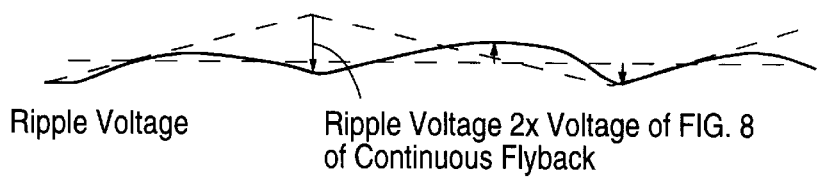
Figure 10D:
Figure 10E:

FIG. 8 is a schematic diagram of another embodiment of the offset resonance zero volt switching flyback converter of the present invention. This circuit is an extension of that of FIG. 5 and uses a secondary winding connected to ORZ transformer 250 to provide energy derived from the ORZ transformer to the secondary load, rather than to the input supply, as in the circuit of FIG. 5. There is a benefit to this arrangement which provides an advantage over a normal continuous Flyback converter with or without a primary side clamp circuit. This advantage is to commutate energy from the main Flyback transformer to provide both types of ORZ resonances and put a significant proportion of the energy into the secondary load. This energy is provided by winding 226 and rectifier 107 to output capacitor 108 after a turn off of the main power switch using the second ORZ resonance condition. The energy is supplied to the secondary circuit during the period when energy is not supplied by the secondary circuit, i.e., during the period when the primary power switch Q1 is conducting. This will provide a significant improvement in the ripple current requirement for the output capacitor 108, possibly reducing the ESR resistive loss by a factor of four in the capacitor. There will also be an increase in the ripple current frequency by up to a factor of two, as shown in the waveforms of FIGS. 10(D) and 10(E). Furthermore, because the frequency has increased, a reduction in the ripple voltage by up to a factor of two is also possible (see FIG. 10(C)). Note that ringing at the turn off for Schottky diode 107 will be suppressed by snubber components resistor 225 and capacitor 227.

Figure 9A:
FIGS. 9(A) to 9(G) are timing diagrams illustrating the operation of the circuit of FIG. 8 under a pre-empted resonance condition.
Figure 9B:
Figure 9C:
Figure 9D:
Figure 9E:
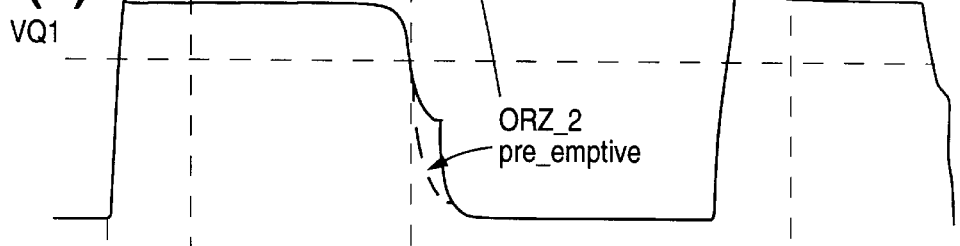
Figure 9F:
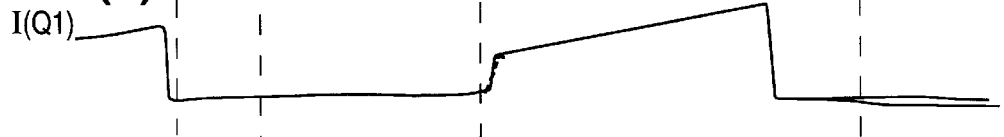
Figure 9G:

In the circuit of FIG. 8, the value of the ORZ inductance will be higher than the value for the circuit of FIG. 5, and the energy is commutated from the transformer, clamp capacitor if the circuit has an active clamp, and from the secondary diode 106 (see FIGS. 9(A) and 9(C)). As the resonance period would be longer than is typical for the first type of ORZ resonance, a preempted resonance condition would be used to reduce the total ORZ period (see FIGS. 9(A) to 9(G), which are timing diagrams describing the operation of the circuit of FIG. 8 under this pre-empted resonance condition).

Figure 11:
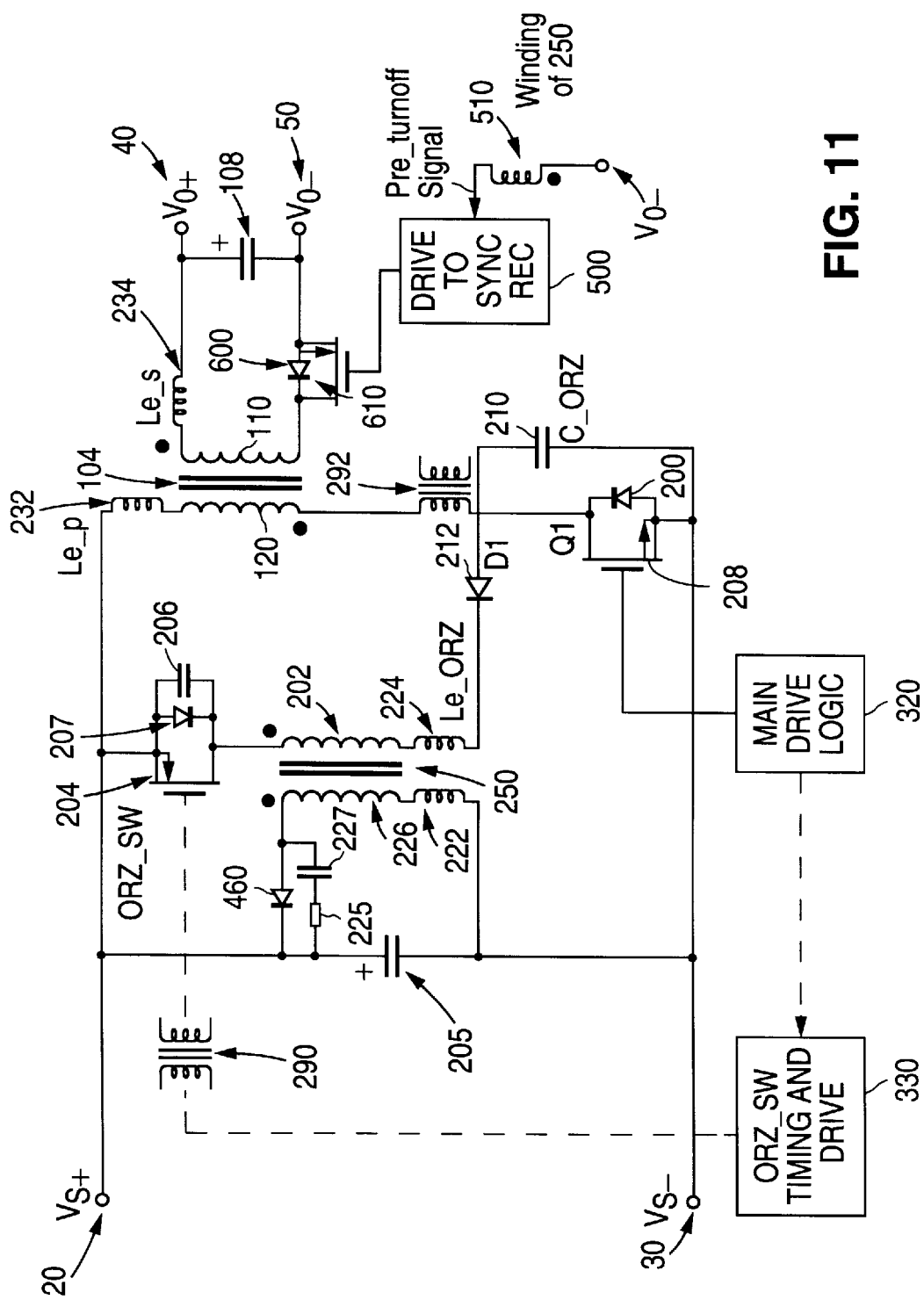
FIG. 11 is a schematic of an embodiment of the offset resonance zero volt switching flyback converter of the present invention which is capable of driving a synchronous rectifier.

FIG. 11 is a schematic of an embodiment of the offset resonance zero volt switching flyback converter of the present invention which is capable of driving an output side synchronous rectifier. The advantages for driving synchronous rectifiers (SR) is evident from the waveforms of FIG. 10(E) and FIG. 10(D). These diagrams indicate that the SR has a reduced DI/DT at turn off, and that in the case of the clamped waveforms, also has a zero current turn on. These are desirable turn off waveforms, allowing optimum DI/DT turn off conditions and also a pre-turn off signal provided via a winding 510 derived from the ORZ transformer 250. Winding 510 can also be used to provide an auxiliary supply which serves as an independent control voltage for the SR whose control voltage may well be significantly higher than the output voltage. In some cases auxiliary winding 226 may not be required because energy can be transferred to the secondary auxiliary supply rather than to the capacitor 205, or as in FIG. 8 to a separate winding 206 and diode 107, thereby supplying power to the output.

Note that in the embodiments shown, including those with and without active clamps, the rectifiers can take the form of fast recovery silicon diodes, schottky rectifiers, synchronous active rectifiers, or any combination of these rectifier types that would be suitable for the particular application.

Figure 12:
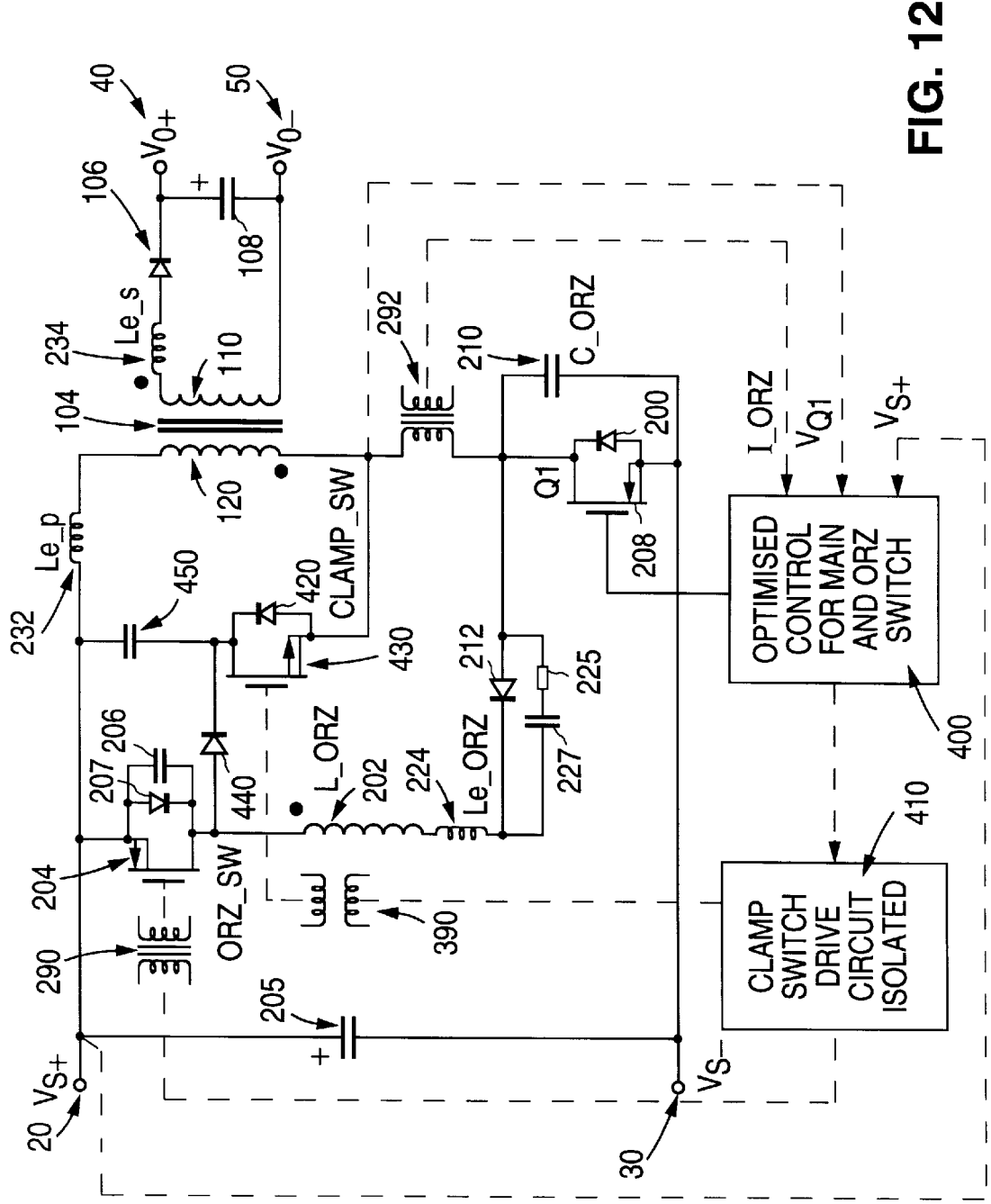
FIG. 12 is a schematic of an embodiment of the offset resonance zero volt switching flyback converter of the present invention which includes an active clamp and an energy recovery system.

FIG. 12 is a schematic of an embodiment of the offset resonance zero volt switching flyback converter of the present invention which includes active clamp components and an energy recovery system. Clamp switch 430 is operated by control signals generated by Clamp Switch Drive Circuit 410. The timing relationships are shown in FIG. 4, with the ORZ switch drive signal (see FIG. 4(C)) via transformer 290 being applied before the clamp drive signal to turn off the clamp drive 4(B). This will provide a period to allow the current to build up in the ORZ inductor which is equal to the current being supplied from clamp capacitor 450 and the primary current in winding 120, reflected back from secondary winding 110 of transformer 104, via clamp switch 430.

As shown in FIG. 4(D), the current falls in clamp switch 430 as the current rises in the ORZ switch, via the ORZ inductor, as has previously been described for the embodiments of the invention which lack an active clamp. However, in the embodiment of FIG. 12, the situation is different because the turn off for the clamp switch will be reduced to zero current. Note the dotted line in FIG. 4(D), showing the high current and significant power loss that occurs for a turn off without the inventive ORZ components. At frequencies of 500 kHZ, this can account for 75% of the total power dissipated in the clamp switch. The turn off of the clamp switch (in order to produce ZVS for the main switch using only the intrinsic component capacitance's) will exhibit a current fall time at the same rate that the voltage falls at the turn off for the clamp switch. This effectively means that the clamp switch turn off loss has been completely removed, and by using the two types of ORZ resonances described herein, the turn off loss for the main power switch will also be significantly decreased.

If it is assumed that the second type of ORZ resonance (or a pre-empted form of such a resonance) is used, any excess energy after the resonance will be clamped into clamp capacitor 450 via diode 440. Energy which is in the ORZ inductor will be clamped by the clamp capacitor, forcing all the current out of the ORZ inductor and leakage inductance via diode 212 into the ORZ capacitor 210. The voltage breakdown rating of the ORZ switch does not need to exceed the overswing voltage, which can be in the range of 100V to 150V, depending on design requirements. The energy put into the clamp capacitor will be recovered at the beginning of the following cycle and will be deposited into the load because the clamp capacitor acts to provide energy during the clamp cycle via the clamp switch to the transformer. After the energy has been released from the ORZ inductor, snubber components (capacitor 227 and resistor 225) can be applied to the diode 212 to limit any transient voltages after the turn off of diode 212.

Figure 13:
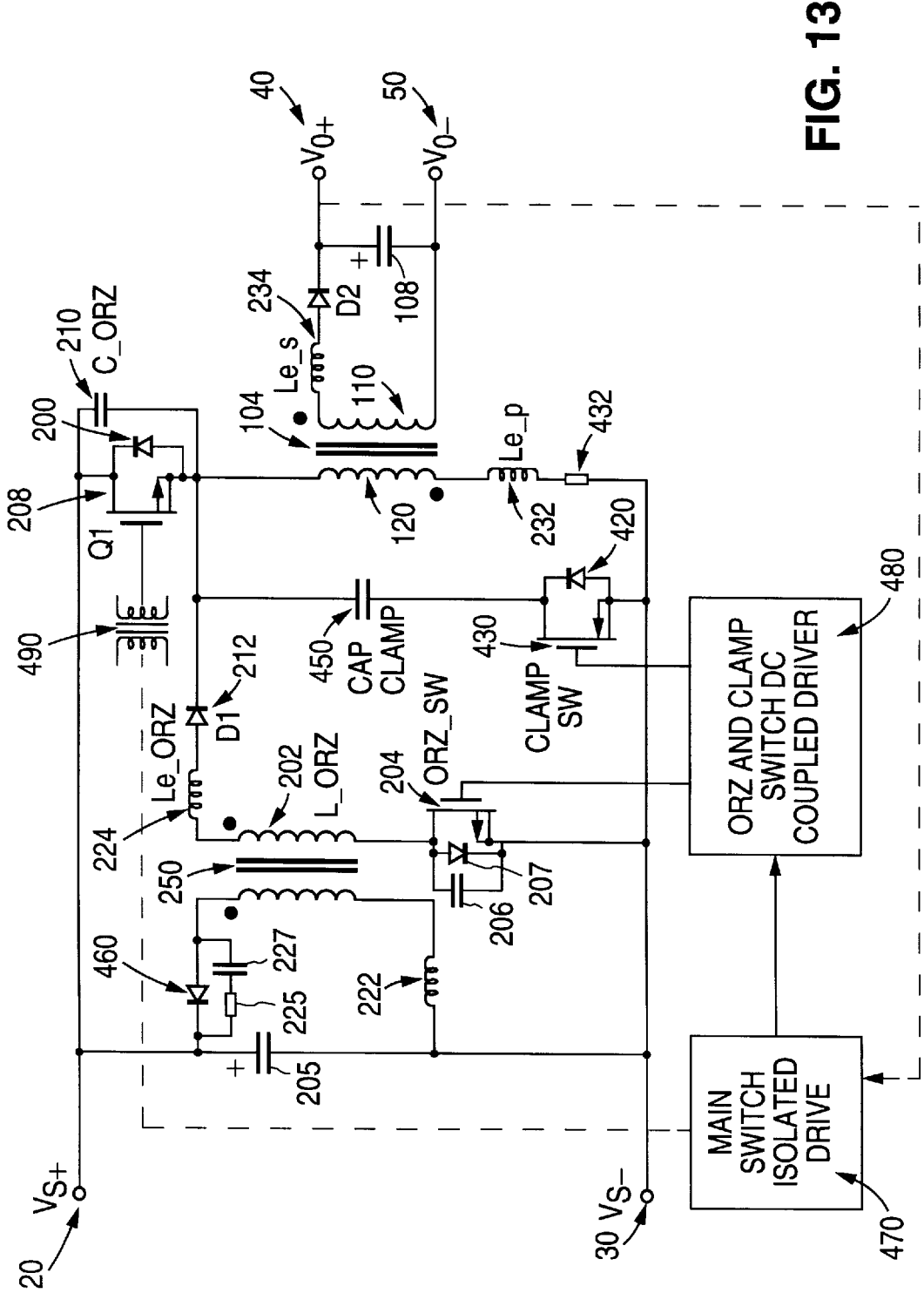
FIG. 13 is a schematic diagram of an embodiment of the offset resonance zero volt switching flyback converter of the present invention which includes a clamp switch referenced to ground.

FIG. 13 is a schematic diagram of an embodiment of the offset resonance zero volt switching flyback converter of the present invention which includes a clamp switch 430 referenced to ground. The embodiment shown in FIG. 13 provides benefits over other designs, including:

(1) The use of one isolated drive transformer, rather than two drive transformers which both reduces cost and physical volume required;

(2) The timing variations, caused by variations in propagation delays in the drive transformers and drive circuits, between the clamp switch and ORZ switch control signals will significantly ease production and therefore reduce costs of the circuit. Direct coupling to the P-channel ORZ switch and the N-channel switch will be easier;

(3) The peak excursion voltages seen on the majority of the circuit will be substantially lower than for a conventional circuit. The only full peak voltage stress is on the junction of the clamp switch drain and the clamp capacitor, which is relatively easier to isolate rather than the primary of the main transformer, the drain of switch Q1, the ORZ capacitance, diode 212, the current transformer 292, and the clamp FET source. The main transformer, with its coupling to the secondary circuit, also provides substantial safety implications. The above features will effectively reduce cost and because of the reduction of the physical safety space, will allow for a more compact overall design.

Figure 14:
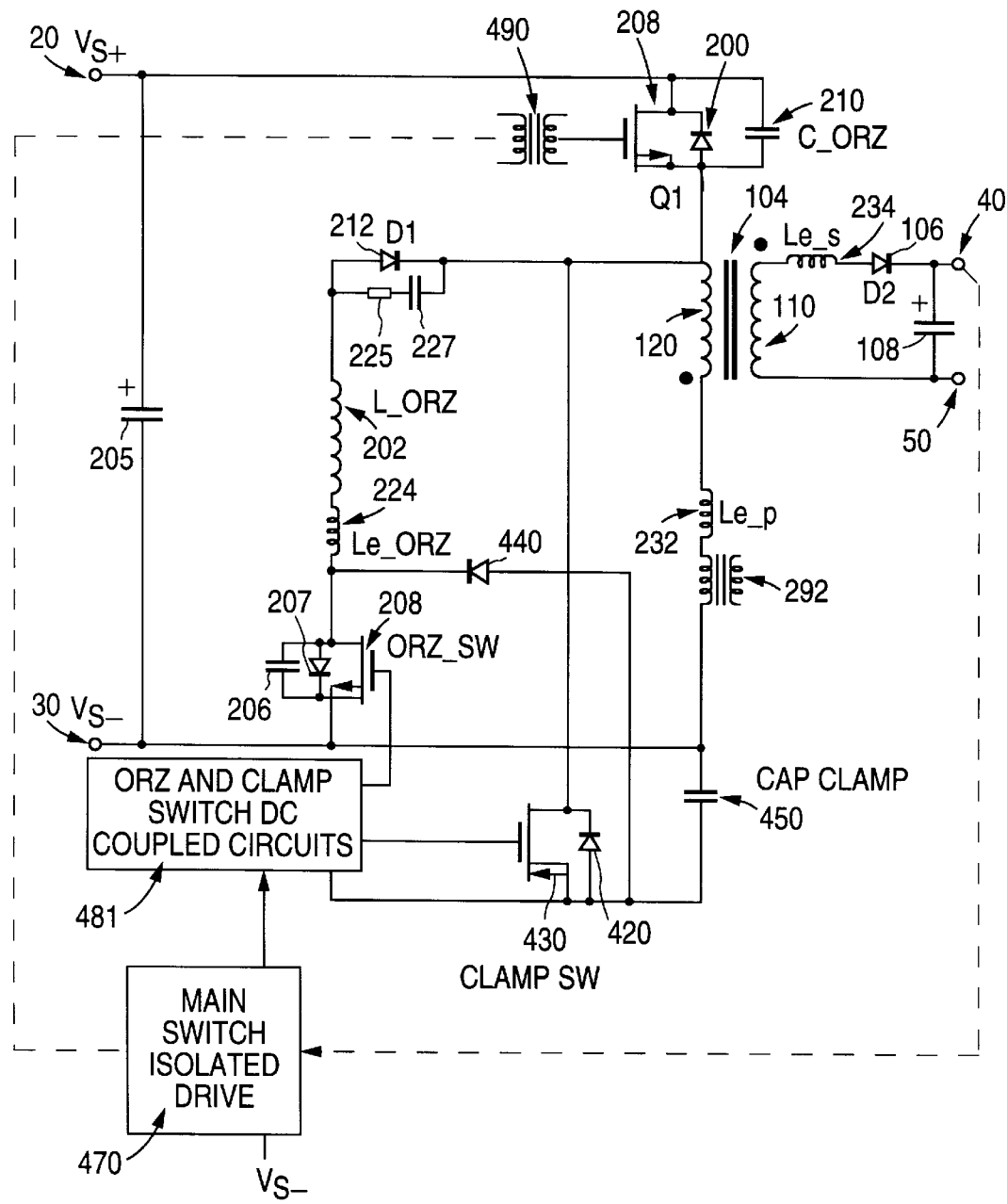
FIG. 14 is a schematic drawing of an embodiment of the offset resonance zero volt switching flyback convert of the present invention which includes a clamp capacitor referenced to a negative value.

FIG. 14 is a schematic drawing of an embodiment of the offset resonance zero volt switching flyback convert of the present invention which includes a clamp capacitor referenced to a negative value. The circuit shown in FIG. 13 for residual ORZ inductor energy recovery can also be designed with the same energy recovery techniques as shown in FIG. 12 by re-arranging the connections so that any excess energy is put back into clamp capacitor 450 via diode 440 (as shown in FIG. 14). As the ORZ switch will be of a P-channel type which is limited in peak voltage, the circuit of FIG. 14 will have clear advantages associated with the overall circuit's robustness. The clamp system has significant advantages in terms of limiting the peak voltage excursions. A possible problem is related to connection from the supply voltage to the gate of the clamp switch 430 based on the clamp capacitor. This is effectively a negative DC voltage ranging from −100V to −180V. However, as this is a DC voltage on the clamp gate with respect to its source, there are well known circuit techniques that can adequately support this interface without the need for an interface transformer.

Figure 15:
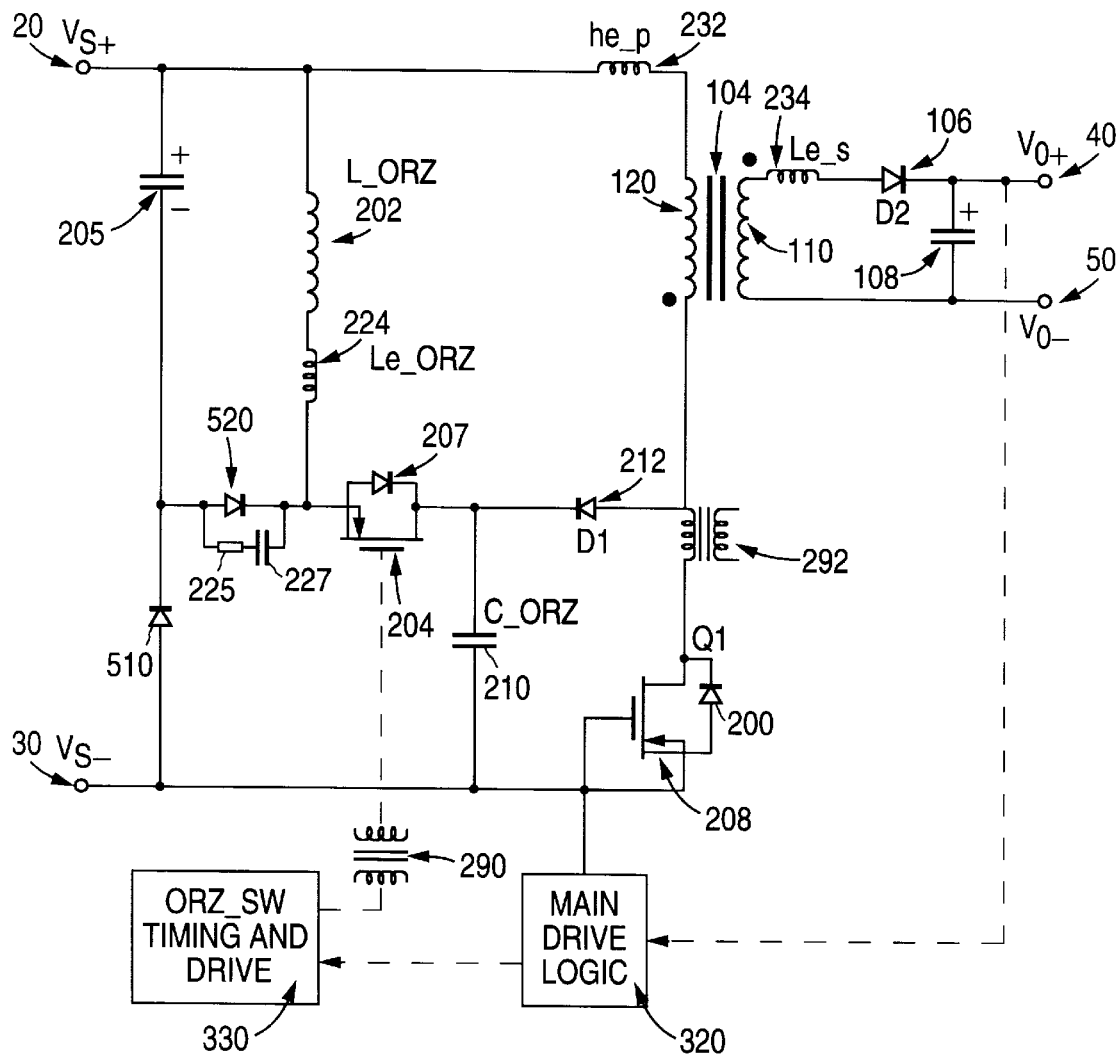
FIG. 15 is a schematic diagram of an embodiment of the offset resonance zero volt switching flyback converter of the present invention which includes the ability to charge up a storage capacitor.

FIG. 15 is a schematic diagram of an embodiment of the offset resonance zero volt switching flyback converter of the present invention which includes the ability to charge up the storage capacitor. In this embodiment, the ORZ inductor 202 and ORZ switch 204 are reversed, with an object of this circuit being to provide energy into capacitor 205. When the input supply is below the voltage on capacitor 205, diode 510 will provide power to the main power switch Q1 and transformer 104.

The first type of ORZ resonance applied to ORZ switch 204 and ORZ capacitor 210 will be resonated via the ORZ inductor. This will cause a voltage reduction on capacitor 210, until diode 520 conducts and connects the ORZ inductor to capacitor 205 to provide energy to recharge the capacitor. Energy has to be put back into the capacitor to replenish the energy taken from it when the voltage on the input terminals is below the voltage on the capacitor. The voltage level chosen should be approximately 80 to 100V for the voltage to be controlled on capacitor 205. Diode D1 is connected so that the ZVS voltage is achieved while switch Q1 does not have to fully discharge capacitor 210. Using the first type of ORZ resonance followed by a preempted version of the second type of resonance can vary the voltage chosen for capacitor 205, and various levels of ZVS can be obtained with the turn off of ORZ switch 204 being clamped into capacitor 205.

Figure 16:
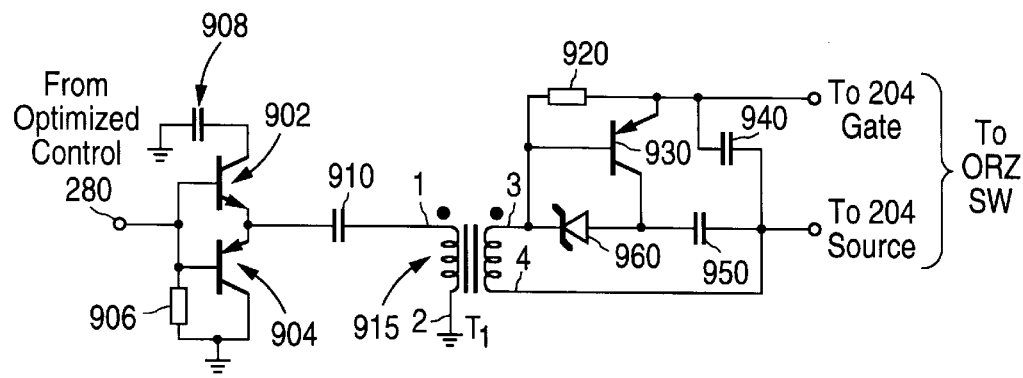
FIG. 16 is a schematic diagram of a driver circuit which can be used to generate the control signals for the ORZ switch of the present invention.

FIG. 16 is a schematic diagram of a driver circuit which can be used to generate the control signals used to operate the ORZ switch of the present invention. The principles of operation of the driver circuit will now be discussed. Transistors 902 and 904 buffer the short duration positive pulse from the controller and couple it via a capacitor-coupled circuit (capacitor 910) to the primary of transformer $T_1$ via pins 1 and 2. Transformer $T_1$ is a toroidal transformer having seven turns wound in a bifilar, low inductance manner. The output from transformer $T_1$ provides a positive signal on pin 3 with respect to pin 4 and this is coupled, via resistor 920 and capacitor 940 to the gate or control node of ORZ switch 204. The source of ORZ switch 204 is connected to pin 4 of transformer $T_1$.

When the signal from the controller changes in phase, signaling a turn off for the ORZ switch, transistor 930 is turned on with it's base connected to pin 3 of transformer $T_1$. A negative voltage, −5V, is developed on capacitor 950 connected to the collector of transistor 930. The emitter of transistor 930 is connected to the gate of ORZ switch 204 and provides a low impedance turn off for the ORZ switch. The negative voltage on capacitor 950 is charged by schottky diode 960 during the turn off period. The level of this negative voltage is a function of the voltage developed across the primary capacitor 910 during the pulse period. Capacitor 940 contributes to an increase in the noise immunity of the circuit when using a low gate to source input capacitance MOSFET, but can be dispensed with when using devices with high input capacitance from gate to source.

With some minor modifications, the driver circuit of FIG. 16 should be suitable for isolated driving of the main switch of a symmetrical active clamp circuit, which is suitable at frequencies of 500 KHz and above. The propagation delays are very small for turn on (10 to 20 nS), and turn off (which can be less than 10 nS). This is an important characteristic for control of the main switch under short circuit conditions. For 500 kHZ operation the duration would be up to 1 uS (1 micro-second) maximum, rather than the 300 to 400 nS (nano-seconds) required for ORZ. This can be accommodated by a small increase in either area of the core or number of turns on transformer $T_1$. Note that a larger reverse voltage on capacitor 950 deposited via diode 960 will occur for long duration pulses, and the value of capacitance 910 may have to be such that it will not change significantly in voltage for longer pulse durations.

The ORZ circuit of the present invention permits the power switch of the flyback converter to be switched on with zero volts across it, in conjunction with a large value of the resonant snubber capacitance. The large snubber capacitance results in a significant reduction in the power losses associated with the switching action of the power switch. This permits high frequency FET switch operation, or the use of slower switching power switches such as insulated gate bipolar junction transistors (IGBT). As the required ORZ inductor value is dependent upon the difference in output voltage and the input supply line (as opposed to the output voltage alone), the inductor value required to ensure correct commutation of the output diode (D1) is reduced. In addition, the reduced voltage differential across the ORZ inductor compared to that of the resonant network inductor of FIG. 2 results in a reduction in the rate of increase of the ORZ inductor current after commutation of the diode. This current will typically reduce in magnitude as the voltage across the ORZ inductor drops below the peak input supply value. The current will continue to reduce in value as the zero volt signal is produced for the power switch. The current level can be reduced to zero or very nearly zero when switching the power switch. This serves to significantly reduce another frequency dependent loss source of such circuits.

As noted, the inventive ORZ flyback circuit utilizes the added ORZ elements to obtain significant benefits over flyback converters which lack those elements. The added ORZ capacitance ($C_{ORZ}$) provides the benefits of reducing the turn off loss for the main power switch, permitting the use of slower IGBT devices as the main power switch, and reducing the ZVS timing requirements at turn on for the main power switch. The inventive circuit also reduces the clamp switch turn off loss and permits the use of IGBTs for the clamp switch in circuits which incorporate an active clamp.

As the main power switch turn off loss is proportional to the product of:

(Switch voltage*current peak)*(fall time of voltage*Frequency of switch signal), and the voltage across the switch is proportional to:

(current peak*fall time)/capacitance, the turn off loss is thus proportional to:

(current peak)²*(fall time)²*Freq./capacitance.

The capacitance value ($C_{ORZ}$) can thus be up to an order of magnitude greater than the parasitic capacitance. This relatively high value of $C_{ORZ}$ capacitance would not normally be used in a flyback converter because of its increased RMS power loss.

As also noted, use of the ORZ elements, in particular the ORZ capacitance permits slower IGBT devices to be used as the main power switch. This is because the higher capacitance value made possible by the ORZ design acts to significantly reduce leakage reactance over-voltage conditions at turn off of the power switch. The ORZ elements also reduce the ZVS timing requirements at turn on for the main power switch by permitting use of a CORZ value which acts to mask any variations in the dominant parasitic output capacitance of the MOSFET power switch.

The foregoing descriptions of the inventive ORZ circuits can be applied to both clamped and unclamped Continuous Flyback Converters. For a clamped converter used with ORZ, the clamp switch will have it's turn off current reduced to zero, so at turn off the clamp loss should be zero, rather than the following expression which describes the operation of the circuit in the absence of the ORZ circuit elements:

Turn off Clamp loss=((current peak clamp)**2*(fall time Clamp)/ intrinsic capacitance.

The turn off loss for the primary power switch is given by:

Turn off Main loss=((current peak main)**2*(fall time main)**2)/ C_ORZ.

Thus, if C_ORZ is 10 times greater than the intrinsic capacitance's, the loss will be 10 times smaller.

The use of the relatively large ORZ capacitance and ORZ switch removes turn off losses for the active switches, which are of similar magnitudes. The current peak for the clamp switch is normally within 20% of the peak current for the main switch and the fall times will be similar.

Although the present invention has been described in terms of a separate, isolated primary transformer winding and ORZ inductance, it is noted that both may be provided by a common winding or coupled inductances. As noted the power switch can be a MOSFET, IGBT device, or BiMOSFET. The ORZ flyback converter disclosed is capable of high efficiency and high frequency operation (e.g., above 250 kHz, depending upon the type of power switch used). The zero voltage switching with minimal switch current achieved by the present invention also results in reduced electromagnetic interference during operation of the converter.

The inventive ORZ flyback converter may be used to provide improved performance in a variety of circuits and devices. These include: (1) high power (1 kW to 3 kW) power factor corrected single phase, single stage isolated converters for use in battery chargers (e.g., for electric vehicles); (2) three phase rectified input at 600V DC isolated power converters producing 3 kW to 5 kW and above, using IGBTs. High voltage FETs, or BiMosfets as the power switching element, for use in Telecom electric vehicle battery chargers; (3) high frequency (250 kHz to 2–3 MhZ) operation with the use of synchronized rectification for low output voltage power converters; and (4) generalized high frequency, high efficiency converters operating at frequencies up to 300 kHz and using slower IGBT's as the main switching element.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A flyback power converter, comprising:
   a power switch and primary winding of a power transformer connected in a series combination, the series combination connected in parallel across first and second input supply nodes;
   a secondary winding of the power transformer connected in parallel across a first and a second secondary side node;
   a rectifier connected in series between the first secondary side node and a first output node;
   an output capacitor connected in parallel across the first output node and a second output node;
   an active clamp switch connected in a series combination with an active clamp capacitor at a first common node, the series combination connected in parallel across the primary winding of the power transformer; and
   a series combination of a switch and a magnetic energy storage element, the series combination connected in parallel across the primary winding of the power transformer;
   wherein the value of said active clamp capacitor is selected so that a zero voltage switching condition is generated across the power switch only in conjunction with operation of said series combination of the switch and the magnetic energy storage element.

2. A flyback converter comprising:
   a power switch and primary winding of a power transformer connected in a series combination, the series combination connected in parallel across first and second input supply nodes;
   a secondary winding of the power transformer connected in parallel across a first and a second secondary side node;
   a rectifier connected in series between the first secondary side node and a first output node;
   an output capacitor connected in parallel across the first output node and a second output node;
   an active clamp switch connected in a series combination with an active clamp capacitor at a first common node, the series combination connected in parallel across the primary winding of the power transformer; and
   a series combination of a switch and a magnetic energy storage element, the series combination connected in parallel across the primary winding of the power transformer, the series combination of the switch and the magnetic energy storage element including a second rectifier arranged in series with the switch and magnetic energy storage element and oriented to permit current flow from the primary winding to the magnetic energy storage element in normal operation;
   wherein the value of said active clamp capacitor is selected so that a zero voltage switching condition is generated across the power switch only in conjunction with operation of said series combination of the switch and the magnetic energy storage element.

3. The flyback convert of claim 2, wherein the switch and magnetic energy storage element are connected in series at a second common node, and the converter further comprises:

a third rectifier connected between the first common node and second common node and oriented to permit current flow from the second common node to the first common node in normal operation.

4. The flyback converter of claim 2, wherein the second rectifier is oriented to permit current flow from the magnetic energy storage element to the primary winding in normal operation.

5. The flyback converter of claim 4, wherein the switch and magnetic energy storage element are connected in series at a second common node, and the converter further comprises:

a third rectifier connected between the first common node and second common node and oriented to permit current flow from the first common node to the second common node in normal operation.

6. The flyback converter of claim 4, further comprising:

a second magnetic energy storage element coupled to the first magnetic energy storage element, wherein the second magnetic energy storage element is connected across the first and second input supply nodes; and an input capacitor connected in parallel across the first and second input supply nodes.

7. A flyback converter, comprising:

a power switch and primary winding of a power transformer connected in a series combination, the series combination connected in parallel across first and second input supply nodes, wherein the power switch is operable to permit current to flow between a first power switch node and a second power switch node;

a capacitive element connected in parallel across the first and second power switch nodes;

a secondary winding of the power transformer connected in parallel across a first and a second secondary side node;

a rectifier connected in series between the first secondary side node and a first output node;

an output capacitor connected in parallel across the first output node and a second output node;

an active clamp switch connected in a series combination with an active clamp capacitor at a first common node, the series combination connected in parallel across the primary winding of the power transformer; and a series combination of a switch and a magnetic energy storage element, the series combination connected in parallel across the primary winding of the power transformer;

wherein the value of said active clamp capacitor is selected so that a zero voltage switching condition is generated across the power switch only in conjunction with operation of said series combination of the switch and the magnetic energy storage element.

8. The flyback converter of claim 7, wherein the magnetic energy storage element is an inductor.

9. The flyback converter of claim 7, wherein the power switch is a FET device.

10. The flyback converter of claim 7, wherein the power switch is an insulated gate bipolar transistor device.

11. The flyback converter of claim 7, wherein the active clamp switch is a FET device.

12. The flyback converter of claim 7, wherein the active clamp switch is an insulated gate bipolar transistor device.

13. The flyback converter of claim 7, wherein the switch is a FET device.

14. The flyback converter of claim 7, wherein the active clamp switch is referenced to a ground level.

15. The flyback converter of claim 7, further comprising:

a controller operable to cause the power switch to be turned on when the voltage across the power switch is substantially equal to zero volts.

16. The flyback converter of claim 7, wherein the rectifier is a synchronous rectifier.

17. A flyback power converter, comprising:

a power switch and primary winding of a power transformer connected in a series combination, the series combination connected in parallel across first and second input supply nodes;

a secondary winding of the power transformer connected in parallel across a first and a second secondary side node;

a rectifier connected in series between the first secondary side node and a first output node;

an output capacitor connected in parallel across the first output node and a second output node;

a switch connected in a series combination with a first magnetic energy storage element, the series combination connected in parallel across the primary winding of the power transformer;

a second magnetic energy storage element coupled to the first magnetic energy storage element, wherein the second magnetic energy storage element is connected across the first and second input supply nodes; and an input capacitor connected in parallel across the first and second input supply nodes.

18. The flyback converter of claim 17, wherein the series combination of the switch and the first magnetic energy storage element further comprises:

a second rectifier arranged in series with the switch and magnetic energy storage element and oriented to permit current flow from the primary winding into the magnetic energy storage element in normal operation.

19. The flyback converter of claim 18, further comprising:

a third rectifier arranged in a series combination between the second magnetic energy storage element and the first input supply node and oriented to permit current flow from the second magnetic energy storage element to the first input supply node in normal operation.

20. The flyback converter of claim 17, wherein the power switch is operable to permit current to flow between a first power switch node and a second power switch node, and the flyback converter further comprises:

a capacitive element connected in parallel across the first and second power switch nodes.

21. The flyback converter of claim 17, wherein the first magnetic energy storage element is a primary winding of a transformer and the second magnetic energy storage element is a secondary winding of the transformer.

22. The flyback converter of claim 17, further comprising:

a controller operable to cause the power switch to be turned on when the voltage across the power switch is substantially equal to zero volts.

23. The flyback converter of claim 17, wherein the power switch is a FET device.

24. The flyback converter of claim 17, wherein the power switch is an insulated gate bipolar transistor device.

25. The flyback converter of claim 17, wherein the switch is a FET device.

26. The flyback converter of claim 17, wherein the rectifier is a synchronous rectifier.

27. The flyback converter of claim 18, wherein instead of being connected across the first and second input supply nodes, the second magnetic energy storage element is connected in a series combination with a third rectifier with the series combination connected in parallel across the output capacitor, and further, wherein the third rectifier is printed to permit current flow from the second magnetic energy storage element to the output capacitor in normal operation.

28. The flyback converter of claim 27, wherein the power switch is operable to permit current to flow between a first power switch node and a second power switch node, and the flyback converter further comprises:

a capacitive element connected in parallel across the first and second power switch nodes.

29. The flyback converter of claim 27, wherein the first magnetic energy storage element is a primary winding of a transformer and the second magnetic energy storage element is a secondary winding of the transformer.

30. The flyback converter of claim 27, further comprising:

a controller operable to cause the power switch to be turned on when the voltage across the power switch is substantially equal to zero volts.

31. The flyback converter of claim 27, wherein the rectifier is a synchronous rectifier.

32. The flyback converter of claim 27, wherein the third rectifier is a synchronous rectifier.

33. A flyback power converter, comprising:

a power switch and primary winding of a power transformer connected in a series combination, the series combination connected in parallel across first and second input supply nodes;

a secondary winding of the power transformer connected in parallel across a first and a second secondary side node;

a rectifier connected in series between the first secondary side node and a first output node;

an output capacitor connected in parallel across the first output node and a second output node;

a switch connected in a series combination with a magnetic energy storage element and a second rectifier, the series combination connected in parallel across the primary winding of the power transformer, the switch and magnetic energy storage element being connected at a common node, and the second rectifier oriented to permit current flow from the primary winding to the switch in normal operation;

a third rectifier and an input capacitor connected in a series combination at a second common node, the series combination connected in parallel across the first and second input supply nodes; and a fourth rectifier connected between the first and second common nodes and oriented to permit current flow from the second common node to the first common node in normal operation.

34. The flyback converter of claim 33, wherein the power switch is operable to permit current to flow between a first power switch node and a second power switch node, and the flyback converter further comprises:

a capacitive element connected in parallel across the first and second power switch nodes.

35. The flyback converter of claim 33, further comprising:

a controller operable to cause the power switch to be turned on when the voltage across the power switch is substantially equal to zero volts.

36. The flyback converter of claim 33, wherein the power switch is a FET device.

37. The flyback converter of claim 33, wherein the switch is a FET device.

38. The flyback converter of claim 33, wherein the rectifier is a synchronous rectifier.

* * * * *